(No Model.) 11 Sheets—Sheet 1.

H. B. & E. MORRIS.
DIAGONAL CANE WEAVING MACHINE.

No. 522,740. Patented July 10, 1894.

Witnesses
W. C. Colics
Jno. A. Christianson.

Inventors
Henry B Morris
Edmund Morris
By Edmund Tucker
Attys

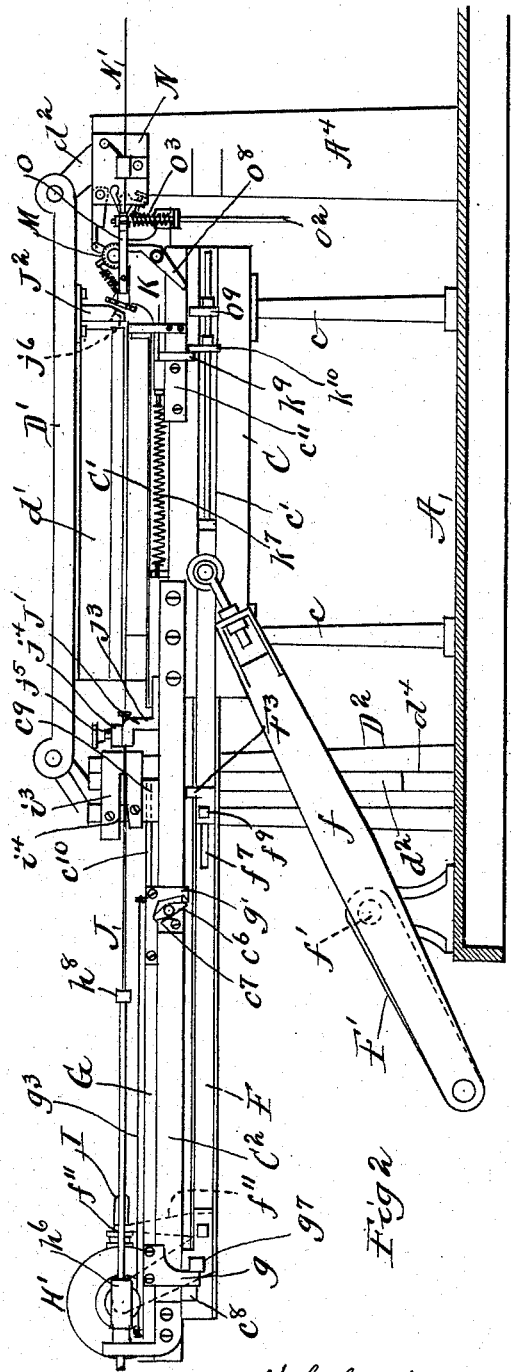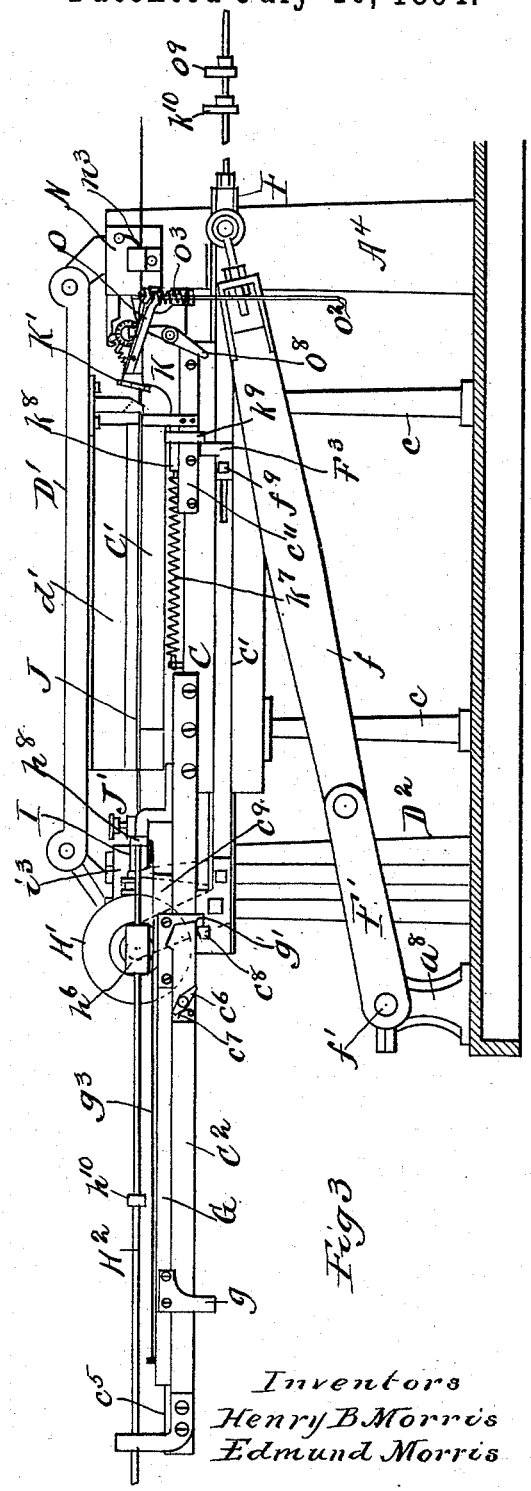

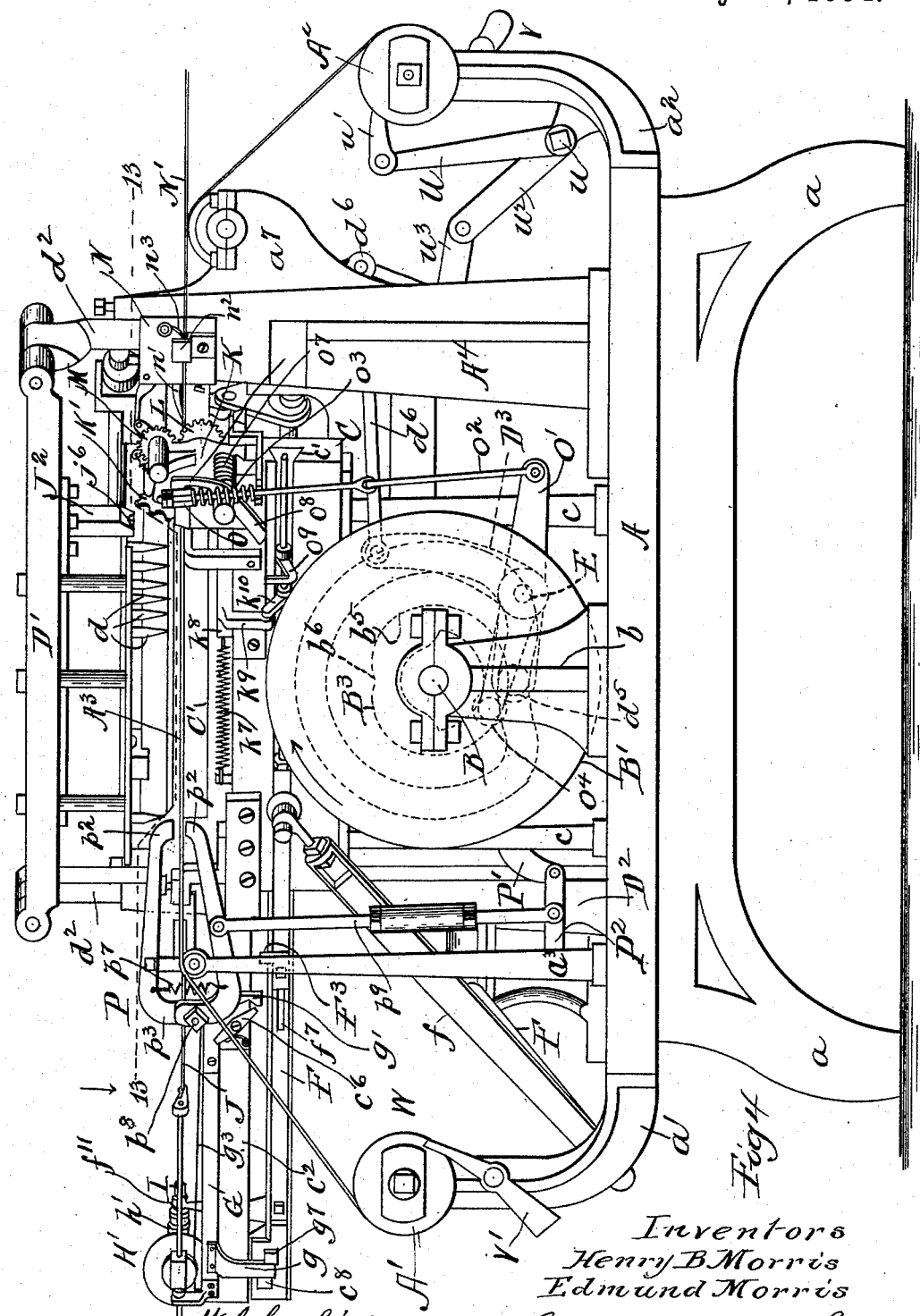

(No Model.) 11 Sheets—Sheet 4.
H. B. & E. MORRIS.
DIAGONAL CANE WEAVING MACHINE.

No. 522,740. Patented July 10, 1894.

Witnesses
W C Coales
Jno. A. Christianson

Inventors
Henry B. Morris
Edmund Morris
B. Robinson Thacher
Attys (No Model.) 11 Sheets—Sheet 5.

H. B. & E. MORRIS.
DIAGONAL CANE WEAVING MACHINE.

No. 522,740. Patented July 10, 1894.

Witnesses
W. C. Coolies
Jno. H. Christianson

Inventors
Henry B. Morris
Edmund Morris
By
Attys

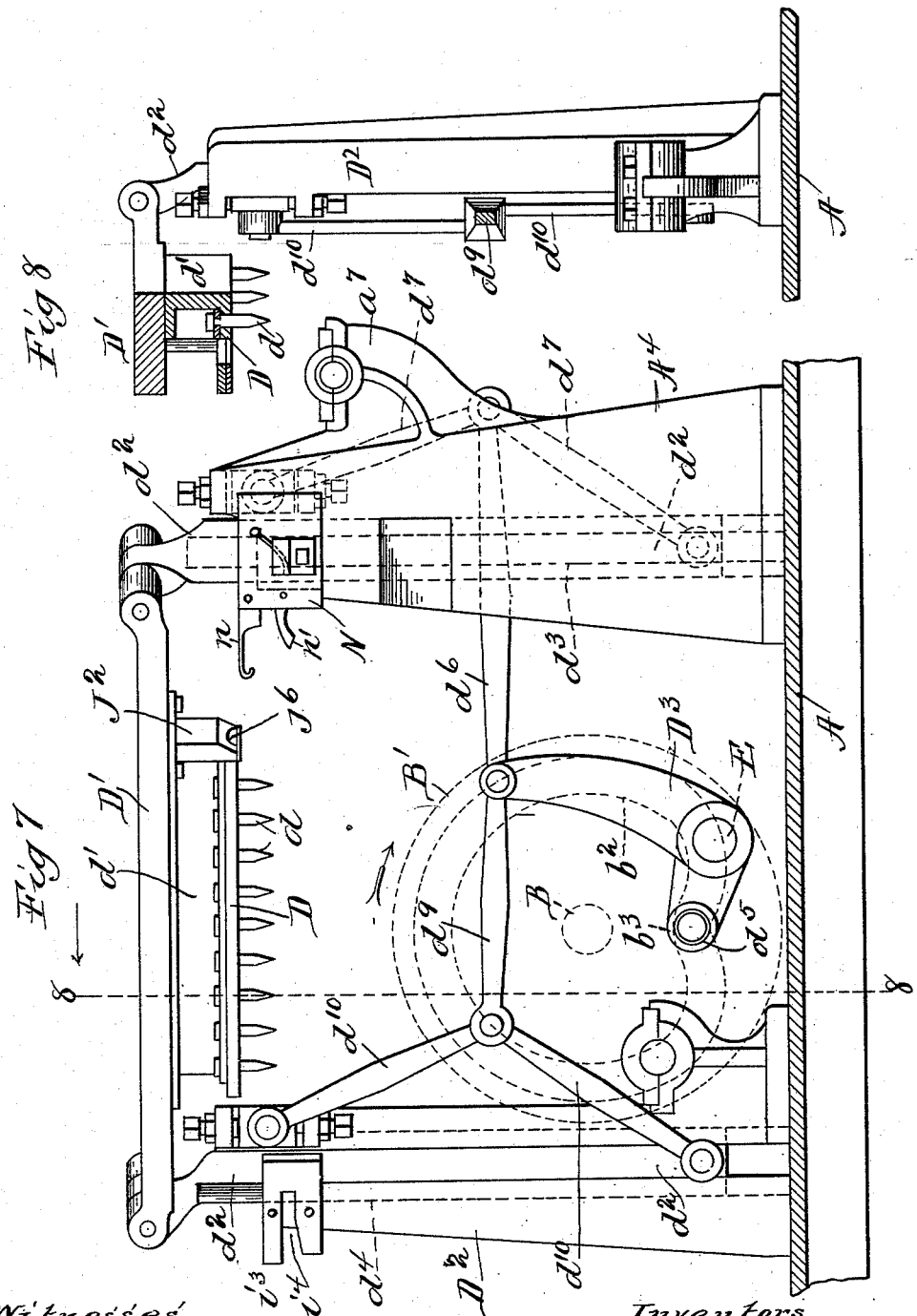

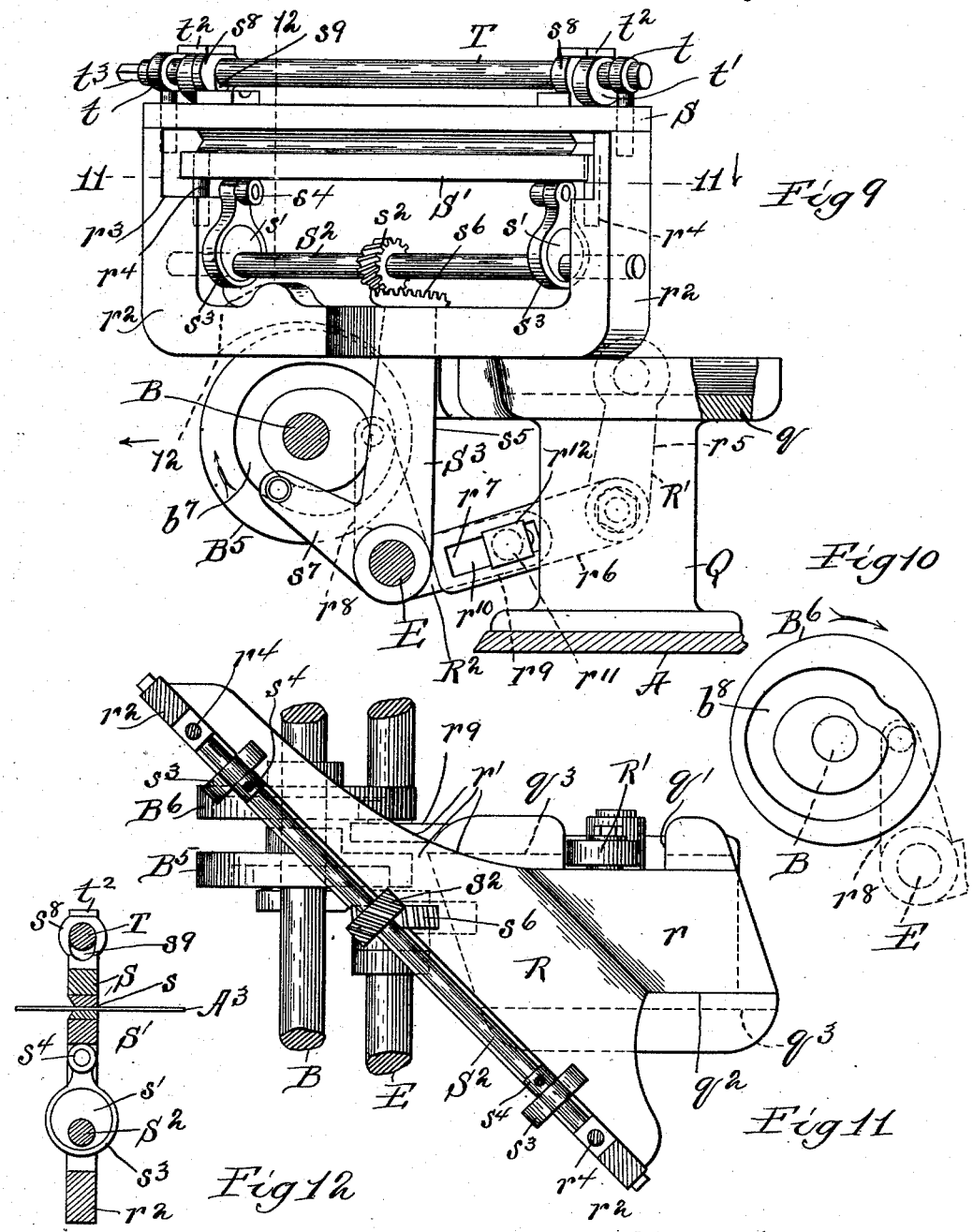

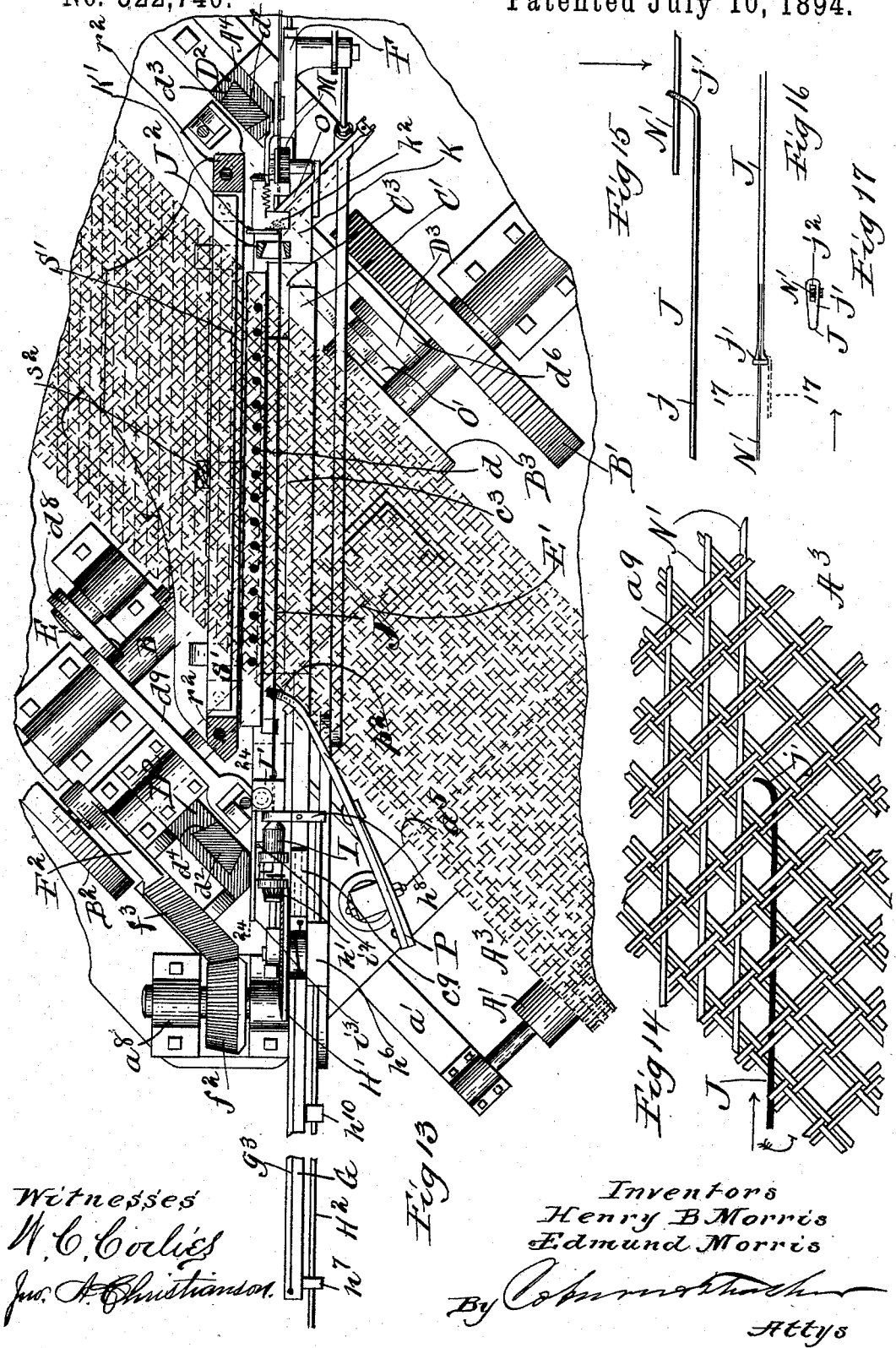

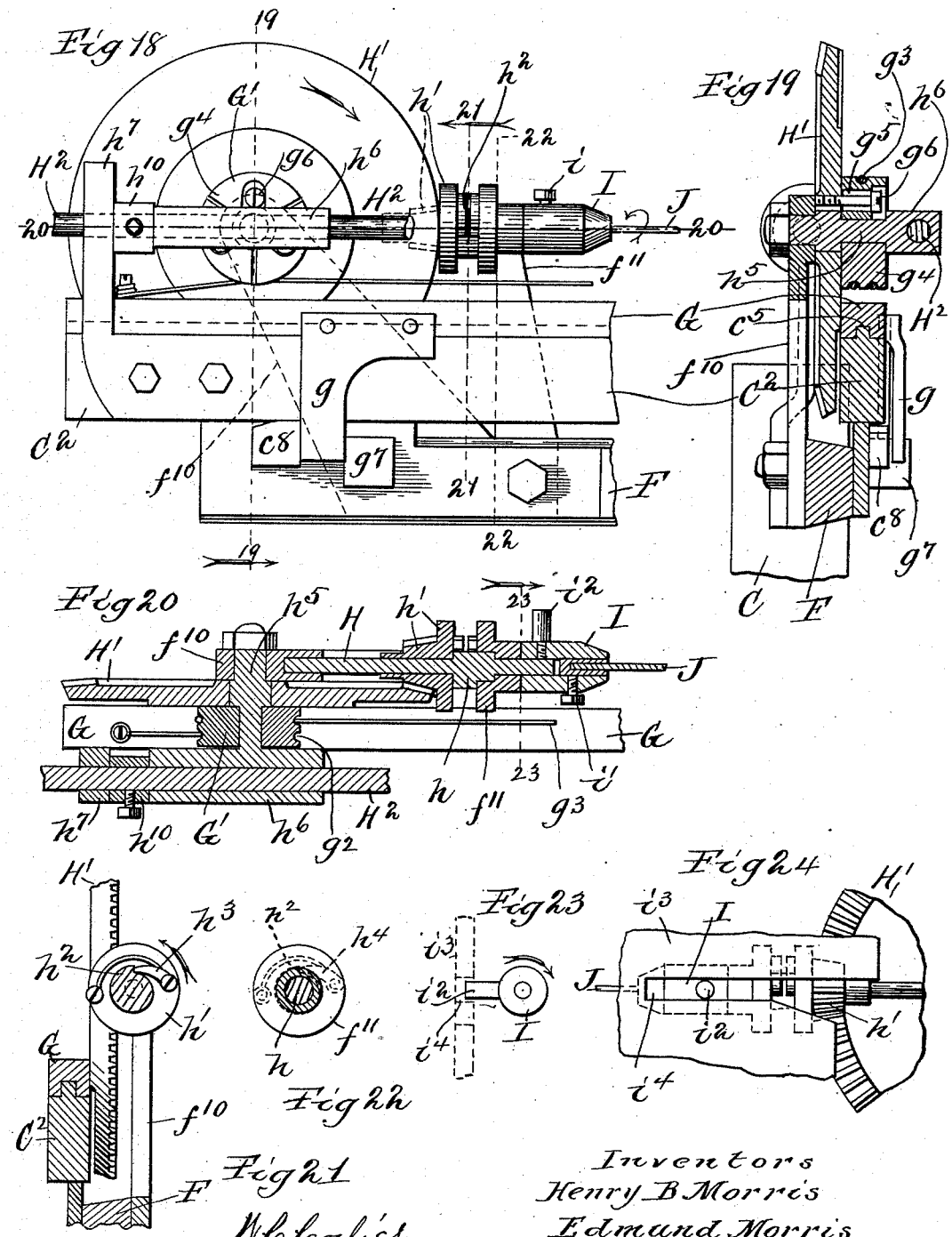

(No Model.) 11 Sheets—Sheet 10.
H. B. & E. MORRIS.
DIAGONAL CANE WEAVING MACHINE.
No. 522,740. Patented July 10, 1894.
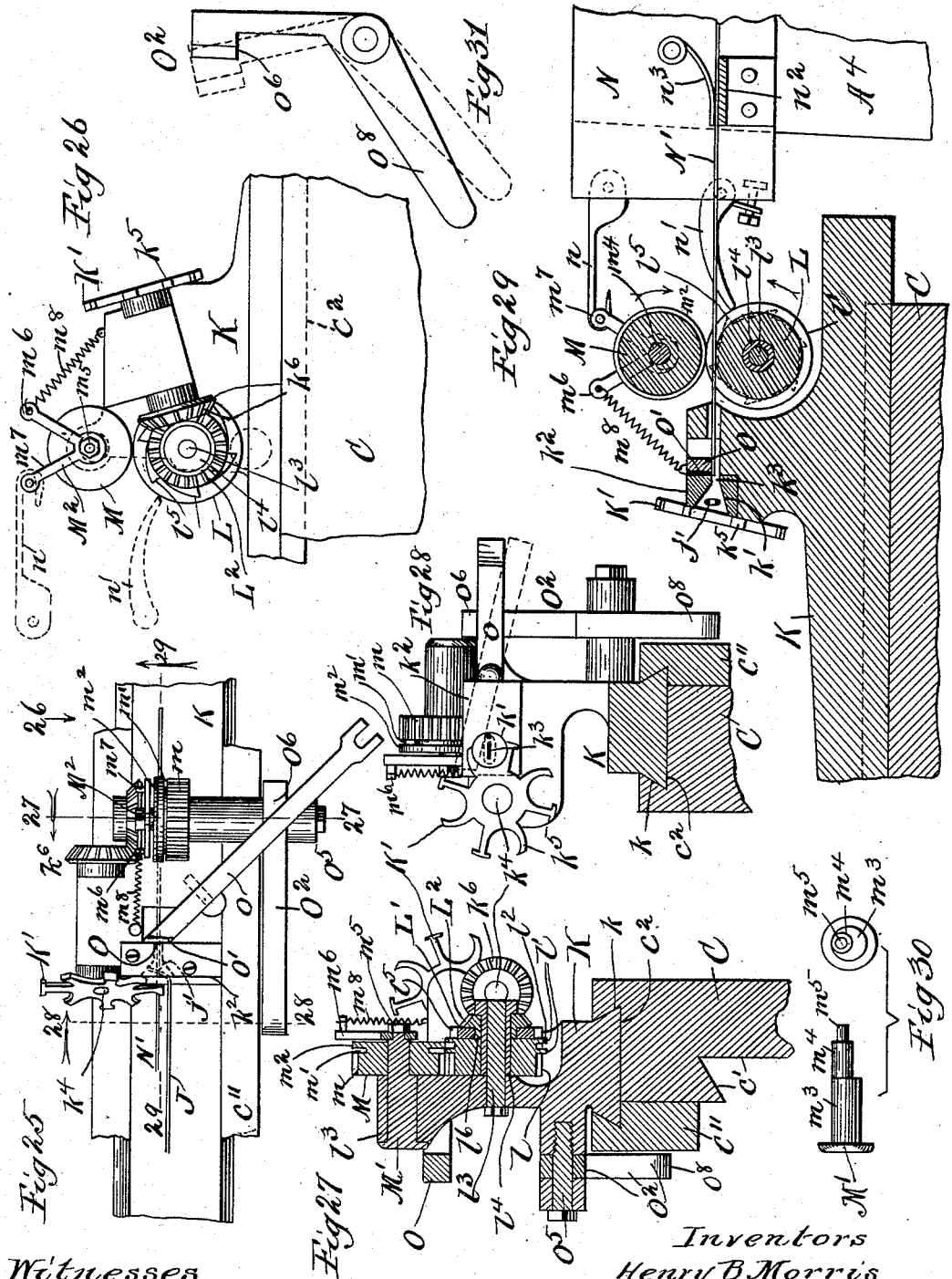
Witnesses
W. C. Coates
Jno. A. Christianson
Inventors
Henry B Morris
Edmund Morris
By Coburn & Thacher
Attys (No Model.)　　　　　H. B. & E. MORRIS.　　11 Sheets—Sheet 11.
DIAGONAL CANE WEAVING MACHINE.

No. 522,740.　　　　　　　　Patented July 10, 1894.

Witnesses　　　　　　　　　Inventors
　　　　　　　　　　　　　　Henry B Morris
　　　　　　　　　　　　　　Edmund Morris

UNITED STATES PATENT OFFICE.

HENRY B. MORRIS AND EDMUND MORRIS, OF MICHIGAN CITY, INDIANA, ASSIGNORS TO FORD, JOHNSON & CO., OF SAME PLACE.

DIAGONAL-CANE-WEAVING MACHINE.

SPECIFICATION forming part of Letters Patent No. 522,740, dated July 10, 1894.

Application filed September 27, 1893. Serial No. 486,603. (No model.)

*To all whom it may concern:*

Be it known that we, HENRY B. MORRIS and EDMUND MORRIS, both citizens of the United States, residing at Michigan City, in the county of La Porte and State of Indiana, have invented certain new and useful Improvements in Diagonal-Cane-Weaving Machines, which are fully set forth in the following specification, reference being had to the accompanying drawings, in which—

Figure 1:
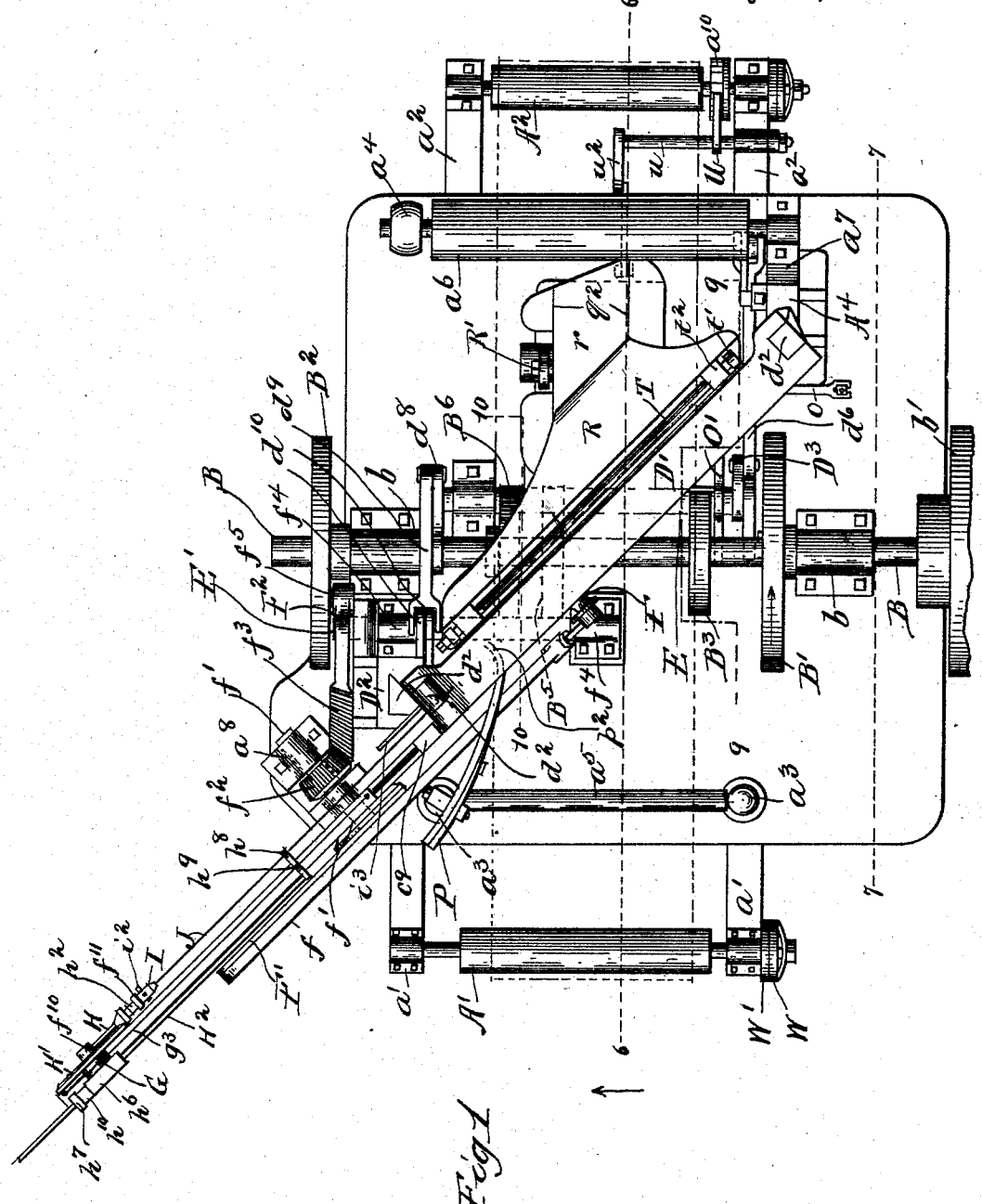
Figure 5:
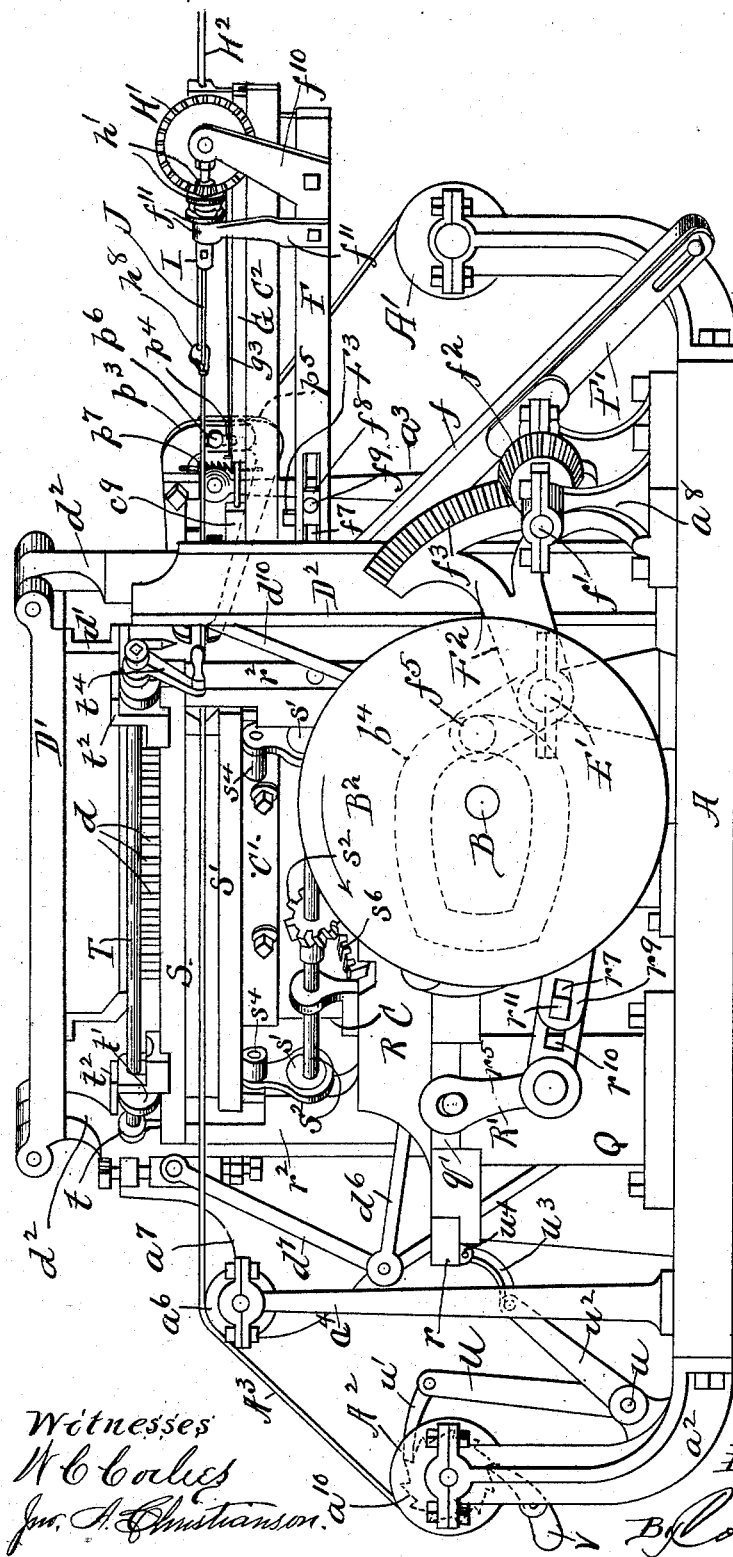
Figure 6:
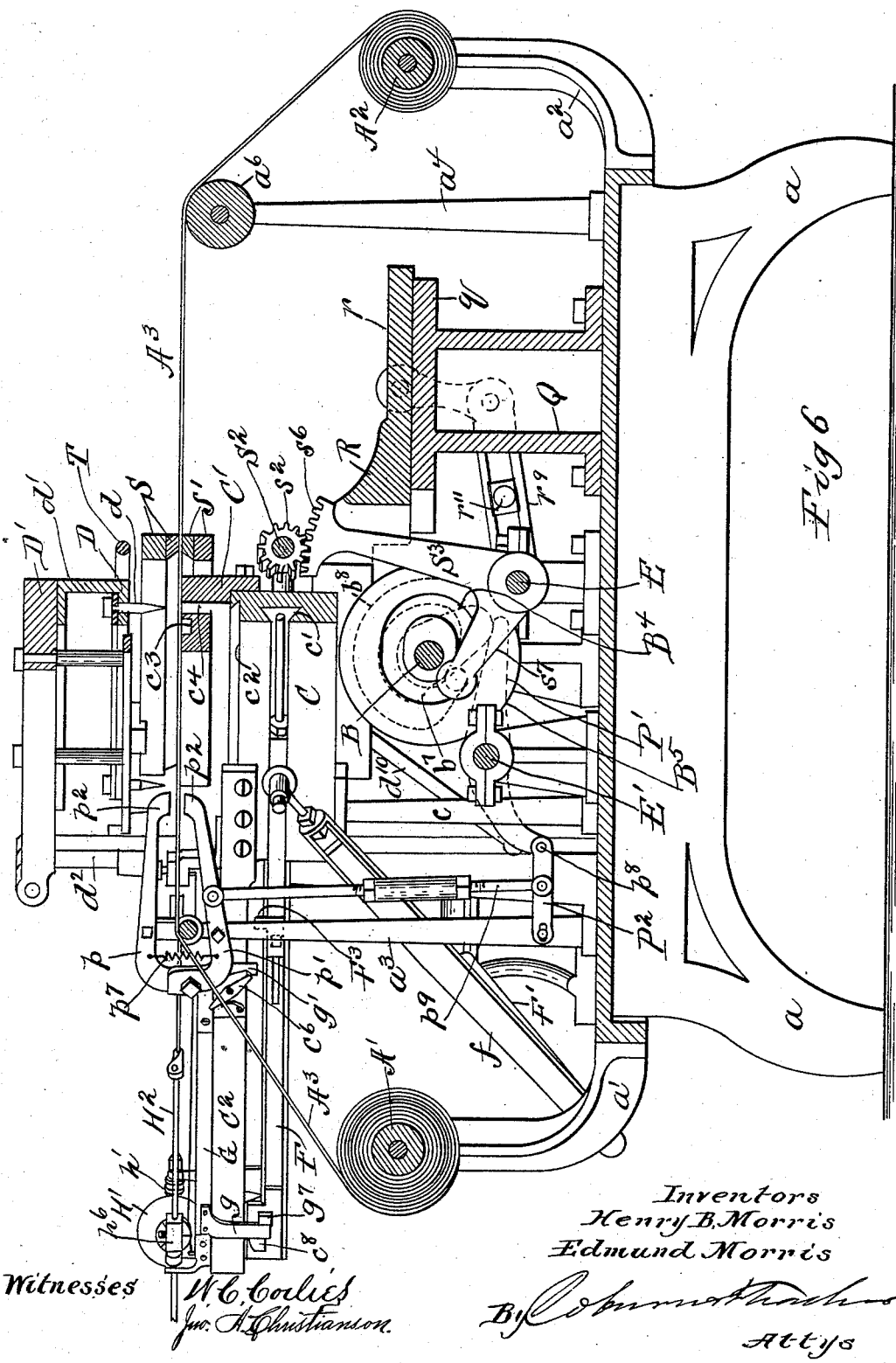
Figure 32:
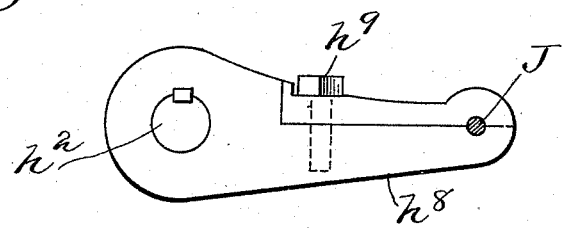
Figure 33:
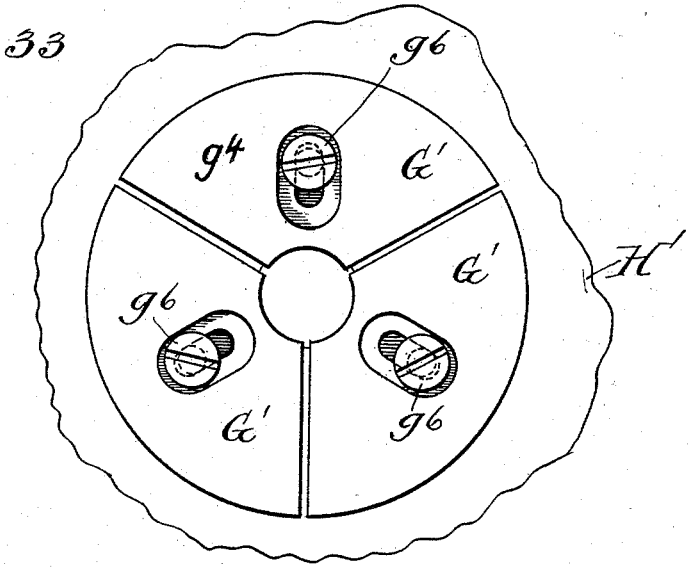

Figure 1 represents a plan view of a machine or loom embodying our invention; Fig. 2, an elevation of the mechanism for operating the diagonal needle, in a position of rest; Fig. 3, a similar view with the mechanism in position at the end of the diagonal movement of the needle; Fig. 4, an elevation of the machine taken at the side thereof (with the driving pulley at the end of the shaft removed); Fig. 5, a similar elevation taken at the back side of the machine; Fig. 6, a vertical section taken on the line 6. 6 of Fig. 1; Fig. 7, a detail section taken on the line 7. 7 of Fig. 1, with the needle mechanism removed and showing the upper mat-clamp; Fig. 8, a detail section taken on the line 8. 8 of Fig. 7; Fig. 9, a detail section similar to Fig. 7, taken on the line 9. 9 of Fig. 1, with the needle and clamping mechanism removed, and showing the web-feeding devices; Fig. 10, a detail section taken on the line 10. 10 of Fig. 1, showing the cam just back of the cam seen in Fig. 9; Fig. 11, a detail plan section taken on the line 11. 11 of Fig. 9; Fig. 12, a vertical section taken on the line 12. 12 of Fig. 9; Fig. 13, a plan section taken on the line 13. 13 on Fig. 4; Fig. 14, a detail plan of a section of mat illustrating the operation of the diagonal strand inserting needle; Fig. 15, a detail plan of the front end of the diagonal needle with a strand threaded; Fig. 16, a side elevation of the same, taken in the direction of the arrow, Fig. 15; Fig. 17, a detail section taken on the line 17. 17 of Fig. 16; Fig. 18, a side elevation of the mechanism detached, for operating the diagonal needle; Fig. 19, a vertical section taken on the line 19. 19 of Fig. 18; Fig. 20, a plan section of the same taken on the line 20. 20 of Fig. 18; Fig. 21, a detail section of the same taken on the line 21. 21 of Fig. 18; Fig. 22, a detail section on the line 22. 22 of Fig. 18; Fig. 23, a detail section on the line 23. 23 of Fig. 20; Fig. 24, a detail vertical section taken on the line 24. 24 of Fig. 13; Fig. 25, a detail plan of the devices for feeding the diagonal strand; Fig. 26, a rear elevation of the same, looking in the direction of the arrow, 26, in Fig. 25; Fig. 27, a detail section taken on the line 27. 27 of Fig. 25; Fig. 28, a detail section taken on the line 28. 28 of Fig. 25; Fig. 29, a detail longitudinal section taken on the line 29. 29 of Fig. 25; Fig. 30, a side and end elevation of the eccentric journal of the upper feed roller; Fig. 31, a detail elevation of the knife-holding catch, detached; Fig. 32 a front elevation of the finger, $h^8$, detached; Fig. 33, a side elevation of the sectional hub, $G'$, detached; and Fig. 34, a detail plan section of the carrier, G, showing the socket therein.

Figure 34:
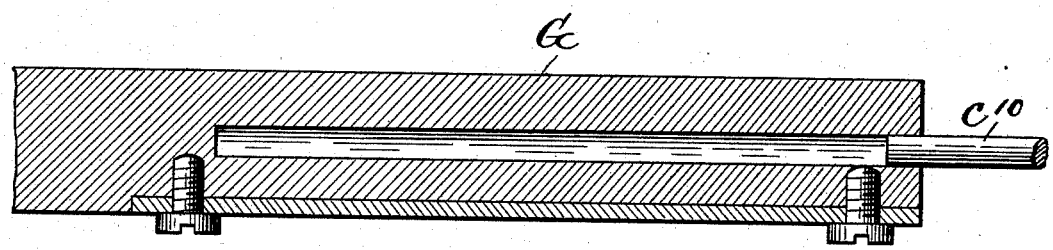

In the drawings, Figs. 1, 2, and 3, are upon one and the same scale; Figs. 4 to 13 inclusive are upon one scale enlarged from that of the former; and Figs. 14 to 31 inclusive are upon one scale, still more enlarged, and Figs. 32, 33, and 34 are upon a scale by themselves, still further enlarged.

Our invention relates to a machine for inserting the diagonal strip in the woven mat or foundation ordinarily produced in making a woven cane fabric. A woven cane fabric is used for many purposes to which it is adapted, and especially for the seats of chairs and other like articles of furniture; and our invention is especially adapted to the production of a fabric for this purpose, but is not limited to the production of a fabric for this or any other special purpose.

In Letters Patent No. 243,012, dated June 14, 1881, there is shown and described a crossing needle or shaft designed to insert the diagonal strips in the cane mat in connection with a hand mechanism for operating this needle for the said purpose. In our invention we use a similar needle, but we perform the entire operation by machinery, and the invention relates to mechanisms whereby the entire operation of inserting the diagonal strips in the mat is performed automatically.

We will now describe in detail the construction and operation of a machine in which we have embodied our invention in a practical way, and the improvements which we believeto be new and wish to secure by Letters Patent will then be set out more definitely in claims.

As our invention is embodied in the mechanism shown in the drawings, a separate and independent machine is produced, which is designed to operate upon the mat to insert the diagonal strips. The mat is woven in the ordinary form and upon any suitable machine, the latter forming no part of the present invention; but the invention is not limited to a separate machine, as the mechanisms may be organized in one general machine with the cane-weaving devices for producing the mat. The mechanisms of this machine may be classified in a general way under five different groups: first, mechanism for adjusting, clamping and holding the mat in position for inserting the diagonal strip; second, mechanism for threading the crossing-needle; third, mechanism for operating the crossing-needle; fourth, mechanism for severing the strip and unthreading the needle; and fifth, mechanism for feeding the mat.

In the drawings, A represents the supporting bed of the machine which is mounted in any suitable way, four legs, $a$, being shown for this purpose in the present instance. At the front end of the bed are two short standards, $a'$, extending outward slightly and then bent directly upward; at the rear end there are two similar standards, $a^2$. A drum or roller, A', is mounted in the front standards, $a'$, and a similar drum, $A^2$, in the rear standards, $a^2$. The woven mat, $A^3$, is wound upon the front drum, carried through the machine and operated upon as will presently be described, and then re-wound upon the rear drum. Two standards or posts, $a^3$, are mounted on the bed near the front end thereof, and a similar standard, $a^4$, near the rear end thereof, all being inside the drum standards and rising considerably higher than the latter. A small roller, $a^5$, is mounted in the upper ends of the front posts, and a like but larger roller, $a^6$, in the rear post, $a^4$, and an arm, $a^7$, on a large, wide standard, $A^4$, rising from the bed at the opposite side thereof. These rollers are simply guides for the mat which is carried up over the first, then along through the machine to and over the second, and thence down to the rear drum, as seen in Fig. 6. These rollers are arranged with their upper surfaces in the same plane, so that the mat passing over or held between them will lie in a level position. A shaft, B, is arranged transversely of the bed and about midway of its length, being mounted in suitable bearings, $b$, supported on the bed. This is the main shaft of the machine, from which motion is communicated to all the actuating mechanisms thereof, and is itself driven from any suitable source of power by means of a driving pulley or wheel, $b'$.

We will now describe the mechanism for clamping the mat. A wide, heavy plate or beam, C, is mounted on posts, $c$, fixed on the bed of the machine and arranged so that the plate extends diagonally across the machine, as seen in Figs. 1 and 13. This beam is mounted edgewise and forms the secondary support for several of the mechanisms. In the front side thereof there is cut a longitudinal dove-tail groove, $c'$, and at the front of the upper edge there is also provided a dove-tail edge or seat, $c^2$, also running lengthwise of the beam. A bar, C', is rigidly secured to the rear side of this beam by bolts or otherwise. This bar is right-angled in cross-section, as seen in Fig. 6, and is arranged so that one web thereof stands vertically, when, of course, the other will be horizontal. The fastening bolts pass through the vertical web into the beam, and the horizontal web stands a little above and over the latter, as seen in said Fig. 6. It will be seen that there is thus provided a wide, flat surface on the upper side of this bar. Near the front edge of this surface there is cut a straight rectangular groove, $c^3$, running lengthwise thereof, and just a little back thereof there is provided a series of perforations, $c^4$, extending down through the bar and separated from the groove by a thin wall, as seen in Figs. 6 and 13. This grooved and perforated bar constitutes the lower and fixed member of the clamp. The upper member of the clamp is a strip or plate, D, corresponding in length to the fixed bar, and provided with depending teeth, $d$, corresponding to the perforations in the latter. This toothed member is mounted above the fixed member and so as to be movable vertically. As shown in the drawings, this is accomplished by mounting the said toothed strip on a cross-head, D', on which is a depending bar, $d'$, carrying the toothed bar at its lower edge. The cross-head, D', is connected at its respective ends to movable supports, $d^2$, which are mounted in upright guide-ways so that they are free to slide vertically therein. These guide-ways are dove-tail grooves, (Fig. 13,) one of which, $d^3$, is formed on the inside of the standard, $A^4$, and the other, $d^4$, in a somewhat similar standard, $D^2$, at the opposite side of the machine, the slides themselves being dove-tailed to fit these guide-ways. The vertical movement of this toothed member of the clamp is effected by the following devices: A cam, B', is secured to the main shaft near its end, on the side of the machine on which the driving wheel or pulley of the main shaft is located, as seen in Fig. 1. This cam is constructed with a cam groove, $b^2$, in its inner face, which is circular in contour except at one point where it bends sharply inward toward the axis, as seen at $b^3$ in Fig. 7. A bell-crank lever, $D^3$, is mounted rigidly on a rock-shaft, E, arranged below and a little in rear of the main shaft. The short arm of this lever is provided with a roller-pin, $d^5$, which enters the groove in the cam; the long arm thereof is connected by a link-rod, $d^6$, to toggle-arms, $d^7$. At the other end of the rock-shaft, E, there is fixed a simple crank-arm, $d^8$, which is connected by a link-rod, $d^9$, to a like set of toggle-arms, $d^{10}$. The upper members of these toggle-arms are pivotally connected to the upper end of the respective guiding standards while the lower ends are hinged respectively to the lower ends of the sliding supports, $d^2$, as seen in Fig. 7. Obviously, when the toggle-arms are thrown out of perpendicular, the slides will be lifted, thereby raising the toothed member of the clamp. This movement is effected by the swinging of the bell-crank lever by the cam, B'; the cam-groove therein being circular, this lever will remain in the same position during the entire travel of the cam except at one point, $b^3$; when this bend in the cam-groove reaches the short arm of the lever, the latter will be thrown upward, thereby turning the long arm outward, rocking the shaft, and so forcing the toggles out of line by means of the link-rods, $d^6\ d^9$, as seen in Fig. 7. This raises the toothed bar and holds it in an elevated position until the bend in the cam-groove is passed, when the toggles are straightened again and the toothed bar is lowered to engage with the lower member, C', of the clamp, thereby securing the mat between these two parts and holding it thus clamped during the remaining portion of the revolution of the cam. The perforations, $c^4$, in the lower clamp bar and the teeth, $d$, in the upper clamp bar are spaced to correspond with the mesh openings or interstices of the mat running on a diagonal line across the latter; hence when the toothed bar descends upon the lower clamp bar the teeth pass through the said respective interstices of the mat, thereby adjusting the strands in proper position for the insertion of the diagonal strip. The strands will all be straightened and brought into regular order, properly spaced as required in the finished product.

We will now describe the mechanism for operating the needle. A long sliding bar, F, is mounted in the dove-tail groove, $c'$, in the side of the beam, C, being held to the beam by its dove-tail shape and mounting, while, at the same time, it is free to slide lengthwise in its support. This is the main slide of the machine and is reciprocated by means of a pitman, $f$, pivoted at one end to the bar and at its other end to a crank, F', on a short shaft, $f'$, mounted horizontally on suitable standards, $a^8$, on the bed of the machine and near its rear edge. This short shaft is provided with a bevel-pinion, $f^2$, fixed thereon, which is driven first in one direction and then the other by an oscillating rack-segment, $f^3$, on the outer arm of a bell-crank lever, $F^2$, mounted loosely on a shaft, E'. The shaft is mounted in suitable supports, $f^4$, on the bed, and the short arm of the lever is provided with a roller-pin, $f^5$, fitting the groove, $b^4$, of a cam, $B^2$, fixed on the main shaft, as seen in Figs. 1 and 5, and provided on its inner face with said cam-groove, whereby at intervals the bell-crank lever is vibrated and communicates an oscillatory movement to the crank-shaft, $f'$. A short slot, $f^7$, is cut lengthwise of the bar F near its middle. This slot is to provide for the attachment of an upright lug $F^3$, to the main slide. This is effected by providing the said lug with a block $f^8$, into which a screw, $f^9$, is set through the slot from the opposite side of the bar, thus providing for adjusting the lug lengthwise of the bar and securely fastening it in any position of adjustment. At its extreme outer end the sliding bar, F, is provided with two uprights, $f^{10}$—$f^{11}$, fastened rigidly to the bar and standing a little distance apart. A stiff supporting arm, $C^2$, is rigidly fastened to the rear end of the beam, C, and extends out some distance beyond the latter, as seen in Fig. 4. The upper edge of this rigid bar is provided with a tongue, $c^5$, on which is fitted a sliding carrier, G, having an arm, $g$, running down around the supporting bar to the main slide, F. At the inner end of this carrier there is also a similar depending arm, $g'$, extending down by the side of the stiff arm, $C^2$, and a little way from it. A spring catch or dog, $c^6$, is pivoted to the side of the stiff arm, $C^2$, at a point near the inner end of the carrier, G, when standing at its outward limit, as seen in Fig. 2. This dog is arranged to engage with the said sliding carrier while the parts are in the position stated, a notch being made in the carrier for this purpose. In the drawings the notch is shown in the horizontal portion of the depending arm, $g'$, by which it is fastened to the carrier, and a spring, $c^7$, acts normally to hold the dog in engagement therewith, as seen in Fig. 2. The upper end of the outer upright, $f^{10}$, is somewhat enlarged, and a short shaft, H, is mounted at its outer end in this enlarged head by a step-bearing, and at its other end has a bearing support in the upright, $f^{11}$, as seen in Fig. 20. A needle-chuck, I, is fastened to the inner end of this shaft by means of a set screw, $i$, and the crossing-needle, is secured in the end of this chuck by means of a binding screw, $i'$, while in the other side of the chuck, opposite to this screw, there is set a screw-stud, $i^2$, projecting out from the side of the chuck, as seen in Fig. 20. The shaft, H, is provided with a slight enlargement or collar, $h$, near its inner bearing. In fact, the inner portion of the collar makes a part of the journal in said bearing, as seen in Fig. 20. A bevel pinion, $h'$, is mounted loosely on the shaft just back of this collar. The collar is provided with a ratchet-tooth or rib, $h^2$, and a spring-pressed pawl, $h^3$, on the face of the bevel-pinion is adapted to engage with this tooth and arranged to turn the shaft in its forward movement, but, of course, slipping over the tooth in the backward movement. A similar spring-pressed pawl, $h^4$, is secured to the side of the bearing-post, $f^{11}$, and adapted to engage with the same ratchet-tooth on the shaft to hold the latter from movement during the return movement of the main carrier when the needle must stand at rest. A bevel-gear wheel, H', is mounted loosely on a short transverse shaft, $h^5$, one end of which is supported in the upright, $f^{10}$, and the other by means of a block, $h^6$, which is mounted loosely on a supporting rod, $H^2$, that slides back and forth therein, and on which the block may also freely slide. The sliding rod itself is mounted loosely at its outer end in a standard, $h^7$, fastened to the outer end of the arm, $C^2$. At its inner end this sliding rod carries a rigid cross-arm, $h^8$, which is projected transversely across the slide so as to stand in the path of the needle-chuck as it travels back and forth. The outer end of this arm is divided so as to embrace the needle and give it support, the branches or prongs of the arm being drawn together by means of a screw, $h^9$, to give a good bearing support to the needle, while, at the same time, allowing it to slide easily therein. It is obvious that the rotation of the bevel-gear wheel, H', will rotate the bevel-pinion on the needle-shaft, and if the wheel is rotated in the direction of the arrow seen in Figs. 18 and 21, the rotation of the pinion will be in a direction to engage the pawl thereon with the needle-shaft, thereby giving a rotary movement to the latter also; but if the gear-wheel is revolved in the opposite direction, the rotation of the pinion will be in a backward or inoperative direction, the pawl slipping over the ratchet in this movement and leaving the shaft at rest. In the drawings there is shown a device very suitable for this purpose whereby the forward and reverse movements of the gear-wheel are effected by its bodily movement forward with the main slide on which it is carried. For this purpose a hub, G', is secured to one side of the wheel and mounted loosely on the same shaft therewith. This hub has preferably a spiral circumferential groove, $g^2$, which is for the accommodation of a cable, $g^3$—either rope or wire—which is wound around the hub and fastened at its respective ends to the respective ends of the slide, G. Obviously the bodily movement of the gear-wheel with the slide on which it is mounted will rotate the wheel in one direction or the other, so long as the carrier, G, remains stationary on its supporting arm, so that the gear-wheel is carried bodily along the side of the carrier.

It is desirable to have means for regulating the rotary speed of the needle so that it will accurately work upon the mesh of the mat, which may be varied. The way in which we effect this, as shown in the drawings, is by making the hub, G', in separate pieces or segments, $g^4$, which are in the shape of sectors. Each sector is provided with a transverse aperture, $g^5$, through which a screw-bolt, $g^6$, passes to fasten the sector to the wheel, the aperture being considerably larger than the screw, so that the sector may have radial adjustment while it may be fastened in any position in which it may be set. This provides for a slight enlargement of the hub from its normal size by setting the several sectors out to the same degree radially, and vice versa a like contraction of the same. A stop-collar, $h^{10}$, is slipped on the rod, $H^2$, and fastened in any position required by means of a binding-screw. This stop is located so that when the main slide F is at its outward limit, and the parts are in the position seen in Fig. 18, it will stand just inside of the bracket-arm in which the rod $H^2$ is mounted and right back or outside of the block $h^6$ mounted thereon, as seen in Figs. 18 and 20. On the extreme outer end of the main slide, F, there are two stop-lugs, $c^8$, and $g^7$; both lugs project out from the front side of the slide, but the outside lug, $c^8$, is somewhat shorter than the other, projecting out only about to the hanging arm, $g$, so that it may pass back and forth behind the latter, as seen in Fig. 19, while the inside lug, $g^7$, extends out far enough to stand directly in the path of said arm $g$ and in front thereof, as seen in Figs. 2 and 19. For a purpose hereinafter stated, the said lugs are also placed in different horizontal planes, as shown in Fig. 18. A block, $c^9$, is mounted transversely of the stiff arm, $C^2$, being fixed thereon and standing directly in the path of the sliding carrier, G. This block is provided with a short rod, $c^{10}$, projecting out toward the said carrier G and adapted to enter a socket-aperture in the inner end thereof, as seen in Figs. 2 and 34, whereby this device serves as a guide and support to the carrier, while the block serves as a stop to limit the inward movement of the carrier. A stop-plate, $i^3$, is secured to the side of the standard, $D^2$, about on a level with the needle-chuck in the line of its travel. This plate is provided with a recessed slot, $i^4$, opening toward the needle-chuck and adapted to receive the side-stud, $i^2$, on the chuck, so that the latter will enter this slot, at the inner end of the bodily movement of the needle and its operating devices, and securely hold the chuck from revolving, thereby steadily holding the needle in the position in which it is stopped.

It will be seen from the description given above that, with each revolution of the main shaft, a complete reciprocation back and forth of the main slide will be effected. It is also obvious that during nearly the whole of the forward movement of this slide from the position seen in Fig. 2, the carrier, G, will remain stationary, and, consequently, the gearing for rotating the needle-chuck will be driven by its movement along the said carrier. This movement carries the needle forward across the mat in a diagonal direction, and, at the same time, rotates it.

The needle, J, as already suggested, is of the construction shown and described in the Letters Patent No. 243,012. It consists of a straight shaft, $j$, which is adapted to be set in the chuck. At its forward end it is bent out at almost a right angle to form a bent point, $j'$, slightly flattened and widened, and having an aperture or eye, $j^2$, passing through it, as seen in Figs. 15 and 17.

The operation of the feeding and clamping devices is intended to be such that the mat will be stopped with a diagonal line or row of its interstices, $a^9$, lying directly over the groove, $c^3$, in the bar, $C'$. Now the line of travel of the needle across the mat is in line with this groove, and the coincident rotary movement of the needle will weave it through the line of meshes in the mat lying directly over this groove, the bent tip of the needle being carried over one set of strands and then downward under the next set, by reason of the said bend and rotation, precisely the same as set forth in the said prior patent and as seen in Fig. 14 of the drawings. The groove underneath the mat allows this movement of the bent tip of the needle. The relation of the parts is intended to be such that the eye-point of the needle will reach the outer edge of the mat in this movement at just about the time the movement of the main slide has brought the gearing of the needle to the inner end of the carrier, G; the outer lug, $c^8$, on the main slide will then be brought in contact with the lower end or toe of the spring-catch, $c^6$, thereby tripping the latter and so setting free the carrier, G, the lug $g^7$, being in a lower plane, clearing the catch. For the rest of the movement, the carrier will now move forward with the main slide by contact of the lug, $c^8$, with the depending arm, $g'$, and, of course, the device for driving the needle-gearing will cease to operate and the rotation of the needle will stop. The forward movement continues until the carrier is brought up against the block, $c^9$, as seen in Fig. 3, in which movement the side stud, $i^2$ on the chuck will be directed into the slot in the stop-plate, $i^3$. A stationary needle-support, $J'$, is mounted on the rear end of the beam, C, in a position just about at the limit of the forward travel of the needle-chuck, as seen in Fig. 3. This support consists of a lower member, $j^3$, and an upper one, $j^4$, which is movable and secured to the lower by a suitable setting screw, $j^5$. The two pieces are suitably grooved to make an easy bearing for the needle through which it may freely slide and, at the same time, rotate, the object being to provide a steady support for the needle near its outer end in starting.

The forward travel of the needle, after rotation is stopped as described above, will be practically outside of the front edge of the mat, and is for the purpose of threading the needle. The first movement of the tip end of the needle is over a short level plate, $C^3$, which is fastened to the front end of the bar, $C'$, right in line with the path of the needle, so that the tip end of the latter will be guided onto the plate with the bend in a horizontal position like that shown in Fig. 15. An upright standard, K, is mounted on the dove-tail ledge or seat, $c^2$, of the main supporting beam, C, being provided with a dove-tail foot, $k$, adapted to fit this seat, and held in place by a strip, $c^{11}$, fastened to the front of the said plate, and having a similar dove-tail so that the foot of the standard will be held between the two, as seen in Fig. 27, while, at the same time, it is free to slide back and forth. This sliding standard carries the threading mechanism, which we will now describe. Normally this standard stands at rest just in front of the stationary plate, $C^3$, onto which the needle is guided, as just described above. At its inner end there is a short horizontal arm, $k^2$, which, when the standard is at rest, will stand a little in front of the said guide-plate, $C^3$, and is provided with an opening, $k'$, flaring or funnel-shaped outward toward the said plate, as seen in Figs. 13 and 29, and terminating in a short horizontal slot-like aperture, $k^3$, at the front side of the arm, as seen in Fig. 28, this opening being constructed and adapted to the strip of cane, so that the latter will just pass through it in the horizontal position in which it is fed forward, and which is seen in Fig. 29. Back or inside of this slotted guide there is arranged a star-wheel, $K'$, fixed on a shaft, $k^4$, mounted in a suitable bearing on the back side of the standard, K, and inclined downward from its outer end, as seen in Fig. 26, so that the star-wheel will lie in an inclined plane, the inclination being outward from the machine, as seen in Fig. 29. The arms of this star-wheel are constructed so as to provide a series of circular recesses or seats, $k^5$, alternating with irregular, angular shaped spaces and running circumferentially around the wheel, as seen in Fig. 28, the opening of each recess corresponding to the flaring mouth of the opening, $k^2$, as seen in Figs. 28 and 29. A needle guide and holder, $J^2$, is secured to the upper or movable member, $D'$, of the mat clamp, being in the shape of a leg fastened to and depending from the plate, $D'$, as seen in Fig. 4. This guide is provided at its lower end with a circular groove or recess, $j^6$, adapted to the shaft of the needle, and its location is such that when the said clamp-bar is lowered into the clamping position already described, the lower end of this guide will come down just in front of the plate, $C^3$, and between it and the star-wheel, $K'$, as seen in Fig. 2, the lower end of this depending leg being beveled at the front to correspond to the inclination of the star-wheel, as also seen in said figure. In this position the groove is adapted to receive and guide the tip of the needle as it passes through the same, keeping it in the horizontal position seen in Fig. 15 as it passes to the star-wheel and funnel opening $k'$ in the arm, $k^2$, this groove being also flaring or funnel-shaped, as indicated in dotted lines in Figs. 2 and 3.

Two feed-wheels, L and M, are mounted on the standard, K, on the back side thereof and arranged the latter immediately above the former, as seen in Figs. 27 and 29. These wheels are intended to feed the diagonal strip of cane to the needle for threading, and are arranged just a little in front or outside of the horizontal guide-arm, $k^2$. These wheels are adapted to engage with each other by means of gear-teeth, $l$—$m$, on each, but extending only part way across the periphery of the wheels. On the lower wheel, L, there are provided two narrow annular flanges, $l'$, just outside the teeth on this wheel and extending slightly beyond them, as seen in Fig. 27, thus providing a narrow channel or groove, $l^2$, running around this wheel between the said flanges. The upper wheel, M, has a narrow channel or groove, $m'$, cut entirely around it just outside of the teeth thereon, leaving a thin strip or web, $m^2$, on the outside of the wheel. When the wheels are in mesh, this web will fit into the channel between the flanges on the lower wheel, while the inner of said flanges will enter slightly the annular groove in the upper wheel; but the web enters only part way into the channel, leaving a free space below it, which is of a size to correspond with the diagonal cane strip, thus providing a path for the latter through and between these wheels. The lower wheel, L, is mounted on a fixed journal-pin, $l^3$, fastened rigidly in the standard. A sleeve or thimble, $l^4$, is mounted on this pin, and the wheel, L, is mounted loosely on the sleeve, which also carries next to the wheel a ratchet-wheel, L', provided with teeth, $l^5$, and outside of this a bevel-pinion, $L^2$. As shown in Fig. 27 of the drawings, this bevel-pinion is provided with a short sleeve-hub, $l^6$, on the inside, and the ratchet wheel is mounted on this hub and is, therefore, annular in form, though this is a mere detail of construction which may be varied. Now, these parts must be so arranged and connected that the feed-wheel, L, ratchet-wheel, L', and bevel-pinion, $L^2$, will move together, or in other words, that the ratchet will drive the other two simultaneously. It is obvious that this may be effected in several different ways. It is not important how the connection is made provided only that the three wheels named are caused to move together by the movement of the ratchet wheel. The bevel pinion, $L^2$, is arranged to engage with a similar pinion, $k^6$, on the lower end of the star-wheel shaft, thus providing means for the turning of the said shaft and star-wheel. The journal-pin, M', on which the upper wheel, M, is mounted, is of peculiar construction. The main body, $m^3$, is a small cylinder of uniform size; then just outside of this section is a shorter section, $m^4$, of considerably less diameter than the main body and eccentric thereto, as seen in Fig. 30; and the outer end of the pin is a short angular shank, $m^5$, on the end of the eccentric section. This pin is mounted loosely by its main body, $m^3$, in a suitable bearing in the standard above the lower pin, $l^3$, as seen in Fig. 27, the pin being free to turn in this bearing. The upper feed-wheel, M, is mounted loosely on the eccentric section, $m^4$, just outside the standard and above the lower wheel, L, as also seen in Fig. 27. Obviously the turning of the pin in its bearing in the standard will change the height of the journal of the wheel on account of its eccentricity to the main body of the pin, and so the wheel, M, may be raised and lowered slightly by the oscillation of the pin. This vertical adjustment of the wheel is sufficient to clear it from engagement with the lower wheel when in its highest position of adjustment, that is when its journal is turned to its highest limit with reference to the main body of the pin, as seen in Figs. 27 and 30. In this adjustment the feed-wheels will, of course, be inoperative; but by oscillating the pin so as to turn the eccentric section down, the upper wheel is brought into engagement with the lower, and will then be turned by the latter through the operation of the ratchet already described. It is desirable that this oscillation of the eccentric journal-pin to vertically adjust the upper feed-wheel shall be effected automatically, and any device adapted to this purpose may be employed. What we have adopted and illustrated in the drawings to effect this result is a pronged or forked crank, $M^2$, which is set upon the angular shank, $m^5$, and secured thereon, the aperture in the crank being shaped like the shank so that the crank will be fixed on the pin. The arms of this forked crank are designated in the drawings by the letters, $m^6$—$m^7$, the former being the inner and the latter the outer one with reference to the standard on which this feeding mechanism is mounted. A plate, N, is secured to the standard, $A^4$. A hook, $n$, is pivoted at one end to this plate, and at its other, or hooked, end engages the outer arm, $m^7$, of the lever. This hook is inflexible so that the bodily movement of the standard toward or from the hook will swing the lever and oscillate the journal pin to which it is fastened. The inner arm, $m^6$, of this same lever is connected by a spring, $m^8$, with the standard just back of the star-wheel, as seen in Fig. 29. When this standard is in its normal position of rest, it is at the inner limit of its sliding travel, as seen in Fig. 2, which position it maintains during the forward movement of the needle over and through the mat. The relation of the parts is such that in this position the forked lever will be turned outward by the operation of the stationary connecting hook sufficiently to raise the upper wheel out of engagement with the lower wheel, and, at the same time, straining the retracting spring, $m^8$, as seen in Fig. 29. It will be understood from the description already given that the standard on which this feeding mechanism is mounted is free to slide a certain limited distance on its dove-tailed seat; in the absence of any other force it is held in its inner position of adjustment up close to the depending guide $J^2$ for the needle, as seen in Fig. 2, by means of a retracting spring, $k^7$, fastened at its inner end to the beam, C, and at its outer end secured to the projecting foot, $k^8$, of the standard, as seen in Fig. 2. A short arm or lug, $k^9$, is also secured to this projecting foot of the standard, and depends at the front side of the latter into the path of the lug, $F^3$, on the main slide F. When this lug comes in contact with the depending lug, $k^9$, the further forward movement of the slide will, of course, drive the upright standard, K, outward, as seen in Fig. 3. This occurs just about as the tip of the needle passes out at the front edge of the web, and the further movement of the slide carries the needle to the guiding and holding devices outside of the web and described above. This movement, it will be seen, must also move the standard supporting the feeding devices outward, which movement drops the upper feed-wheel by the combined action of the inflexible hook and retracting spring connected to the respective arms of the forked lever. On the plate, N, there is pivoted a spring pawl, $n'$, which is arranged in the plane of the ratchet of the lower feed-wheel, so that the outward movement of the sliding standard will bring a tooth of this ratchet into contact with the pawl, as indicated in Fig. 29, which results in turning the ratchet and lower feed-wheel, to which it is connected, by this outward sliding movement of the standard, and the upper wheel being dropped into engagement with the lower, as already described, both feed-wheels are turned simultaneously in the direction indicated by the arrows, Fig. 29. The single strip of cane, $N'$, is wound on a drum mounted conveniently to the machine and conducted thence over a level ledge or strip, $n^2$, on the plate, N, to the feed-wheels, being held to this support and guide, $n^2$, by a spring, $n^3$, as seen in Fig. 29. The end of the strip enters the channel between the flanges, $l'$, on the lower wheel, as already described. The lowering of the upper wheel brings its corresponding surface into contact with the strand, and so the latter will be fed forward toward the needle. Toward the latter portion of the outward or forward movement of the main slide, F, just before contact is made with the support, K, the movement of the said slide brings the needle through the star-wheel into the flaring opening in front of the latter, as seen in Fig. 29, and, at the same time, the outward sliding movement of the standard, K, has been sufficient to feed the strand of cane in through the small horizontal slot or opening, $k^3$, to the eye of the needle, which lies in a horizontal position in the flaring opening just back of this slot, as seen in Fig. 29, and to carry the end of the strip through the needle-eye a short distance, about as indicated in Figs. 15 and 25. As already explained, the position of the star-wheel at this time is as seen in Fig. 28, so that the strand as fed through the slot, $k^3$, passes through one of the recesses of the wheel, that is, between two of the arms. A movement of one step is then given to the star-wheel through its gearing connection, explained above, which movement brings the upper arm down upon the end of the strand, projecting through the eye of the needle, as seen in Fig. 25, thereby bending this end down at right angles behind the eye of the needle, the arrangement of the star-wheel being such that its arms will pass just inside of the straight shaft of the needle so as to catch the strand without interfering with the shaft, as indicated in Fig. 25. The point of rest is passed and the main slide now commences its return movement, which obviously will draw the needle back through the mat in the path made on its thrust forward. But, as described above, the diagonal strand has been threaded in the needle and the projecting end bent down at right angles. The first backward movement of the needle will bring this bent end against the front edge of the plate, $C^3$, which doubles this projecting end back around the tip of the needle and back in a horizontal position on the main portion of the strand, as seen in Fig. 16, in which position it will be held as the needle is drawn back through the mat, thereby preventing the unthreading of the strand from the needle, so that it will be certainly pulled through the mat in the path of the needle and woven diagonally into the mat as desired. Obviously as soon as the forward movement of the main slide, F, is completed, the outward movement of the sliding standard, K, ceases, and, consequently, the movement of the feed-wheels. As the slide, F, starts back, the standard, K, follows immediately under the action of its retracting spring, returning the standard to its normal position of rest, with the results already explained. From the description already given of the devices by which the needle is rotated as it is thrust forward, it is obvious that it will remain at rest on the return movement, the spring-pressed driving-pawl $h^3$ yielding to pass over the ratchet on the reverse rotation of the driving pinion, while the stationary pawl $h^4$ holds the needle shaft against any possible movement that might be occasioned by this frictional contact of the driving-pawl. Near the end of this return movement, the lug, $g^7$, on the slide, F, will be brought in contact with the depending arm, $g$, when, of course, the carrier, G, will be then slid outward on its support and restored to its old position of rest, and secured therein by the engagement with the spring-dog, $c^6$. In this retrograde movement the journal block, $h^6$, is brought into contact with the collar, $h^{10}$, on the rod, $H^2$, thereby returning the rod with the needle support which it carries to its normal position.

The single strip of cane, run through the mat as described to form the diagonal strand, must, of course, be severed when it is drawn through the mat. This is done just before the main slide with the needle which it carries has reached the limit of its return movement, and is effected by means of a cutter, O, which consists of a lever, o, pivoted on the standard, K, and extended out diagonally in front of the same, as seen in Figs. 13 and 25, being provided at its inner end with a knife-blade, o'. The edge of the standard, K, is cut out just back of the threading-funnel, k', to permit the inner end of the cutter to pass in over the cane-strip, as seen in Figs. 28 and 29. At the outer end of the cutter-lever, a rod, $o^2$, passes up loosely through the lever, and is secured by a nut turned on its upper end, being free, however, to slide through this opening. Below the lever there is fixed on the rod a spring-coil, $o^3$, being held in position on the rod in any usual way. The lower end of this link-rod is connected to the outer end of a rocking-lever, O', mounted loosely on the rock-shaft, E. A cam, $B^3$, is fixed on the main shaft, B, and provided with a cam-groove, $b^5$, on its inner face, into which is fitted a roller-pin, $o^4$, on the inner end of the rocking-lever, O'. The outer wall of this groove is circular except at one point where it has an inward bend, $b^6$, which acts to vibrate the lever, O', and in such a direction as to depress the outer end of the lever, thereby pulling down the outer end of the cutter-lever and raising the knife at the inner end thereof. The inner wall of this groove, $b^5$, is also circular half way around or more, but is turned inward as the bend in the outer wall is approached, as seen in Fig. 4. This is to provide ample room for the inward movement of the roller pin described above, and the particular contour of this part of the inner wall is not important, provided only it will permit this inward movement of the said pin, as under the influence of the spring, $o^3$, the pin will always follow the outer wall. A dog or catch, $O^2$, is mounted on a horizontal pin, $o^5$, on the standard, K. The upper end of this catch-lever is provided with a notch, $o^6$, which is adapted to pass over the outer arm of the cutter-lever, the catch being properly arranged for the purpose when the said lever is depressed by the cam, $B^3$, as just explained. This catch is provided with a spring-coil, $o^7$, arranged on the pivot-pin, and secured in such a way that it will normally act to throw the catch forward to engage with the cutter-lever when the latter is depressed. Now, the operation of the cam, $B^3$, is to pull down the cutter-lever so that this spring-catch will engage it, but as soon as the bend in the cam-groove passes the inner end of the rocking-lever, the latter is vibrated in the opposite direction, thereby thrusting upward the link-rod, which passes freely through the cutter-lever, which is held in its depressed condition by its catch. This independent movement of the link-rod leaves the cutter-lever depressed and the spring below it compressed, in which position they are held by the catch, the lever being free to move upward when released from the latter; the parts are retained in this relation because the main portion of the actuating cam-groove is circular. The catch-lever is provided with an extended toe, $o^8$, reaching down below the pivot and bending inward toward the machine somewhat, as seen in Figs. 4 and 31. A lug or tappet, $o^9$, is secured to the main slide, F, near the outer or front end thereof, as seen in Figs. 3 and 4, being arranged in the plane of the toe-piece, $o^8$, so that on the backward movement of this slide the tappet engages the toe of the catch and turns the latter backward sufficiently to disengage the cutter-lever, when the tense spring, $o^3$, acts instantaneously to produce a quick sharp movement of the cutter-lever, bringing a quick blow of the knife upon the cane-strand, severing it instantaneously, the action being so quick that the forward movement of the strand will not be interrupted. A tappet or lug, $k^{10}$, is also secured to the main slide, F, just a little inside of the tappet, $o^9$, but arranged to stand inward toward the slide farther than the tappet, $o^9$, so as to travel in a different plane. As shown in the drawings, the tappets, $o^9$ and $k^{10}$, are secured to the slide, F, by means of a stiff rod to which they are fastened, and which in turn is rigidly fastened to the said slide. This, however, is a mere matter of mechanical detail, and the tappets may be secured to the slide by any suitable means which will permit them to perform their functions. This tappet, $k^{10}$, is in line with the lug, $k^9$, depending from the inner end of the standard, K, so that on the return movement of the main slide, F, it will come in contact with said lug at its inner position, and so act in addition with the retracting spring, $k^7$, to positively hold the movable standard, K, in its inner position.

When the cane-strip is severed, as described above, the main strip is held in position by means of the clamping-spring on the plate, N.

The diagonal strand of cane must be unthreaded from the needle after it passes out from the mat on the return movement, in which the strand is drawn through the mat, as already explained. To effect this, we provide a grip, P, which is adapted to seize the strand just outside the rear edge of the mat and hold it long enough to pull the end out of the needle as the latter is carried backward to the end of its movement. This grip is something like a pair of tongs and consists of two arms or members, p, p', each independently pivoted to one of the posts, $a^3$, as seen in Fig. 6, the former above the latter. From their pivotal supports these arms are carried rearward and inward just over the rear edge of the mat, where they are bent outward so as to come directly in the plane of the diagonal strand, as seen in Fig. 13, and so that this strand will pass between them, as seen in Fig. 6. The outer or free ends of the arms have a slight vertical bend or hook-shaped tip, $p^2$, which are flattened, as seen in said Fig. 6, whereby they are adapted to firmly grasp the cane-strand lying between them. The rear ends of these arms beyond their pivots are bent downward and overlap each other, as seen in Fig. 6, and are connected together in a peculiar way. In the bent end, $p^3$, of the upper member of the grip there is cut a slot, $p^4$, and the corresponding bent end, $p^5$, of the lower member is secured to the overlapping end of the upper member by a pivot-bolt, $p^6$, passing through the said slot and a suitable aperture in the lower member, being secured on the outside by a nut $p^8$, as seen in Fig. 4. A spring-coil, $p^7$, is connected at its respective ends to the respective members of the grip back of their pivots, as seen in Fig. 4, and is constructed and applied so as to normally hold the grip slightly open, so that in this adjustment the diagonal strand may pass freely between the gripping ends thereof. On a short shaft, E', mounted on standards a little in front of the main shaft, there is loosely mounted a rocking-lever, P', the front end of which projects out underneath the main shaft, while the rear end, $p^8$, is hinged to the outer end of a swinging arm, P², which is pivoted to the same post, on which the grip is mounted, near its lower end. A connecting rod, $p^9$, joins this swinging arm and the grip, being hinged at its lower end to the said arm between its two end pivots, and at its upper end to the lower member of the grip in front of its pivot, as seen in Fig. 6. A projecting cam arm B⁴, is secured to the main shaft and in such a position that at each rotation its extremity will come in contact with the front end of the rocking-lever, P', whereby the latter is depressed, thereby raising the outer end of the arm, P², and so lifting the connecting rod, $p^9$, and swinging upward the lower member of the grip. By reason of the pivoting of the two grip-arms and their peculiar connection by slot and pin at their rear ends, as already described, this upward swinging of the lower member will cause a corresponding turn downward of the upper, thereby gripping the two upon the cane-strand running between them. This suddenly stops and holds the said strand while the needle continues to move backward to complete its retrograde motion, the result being that the end of the cane-strip threaded into the tip of the needle will be pulled out therefrom and drop loosely at the rear edge of the mat. This action is almost momentary, for the cam, B⁴, soon passes the rocking-lever and the parts at once resume their normal position under the influence of the opening spring on the grip and the weight of the levers and connections below, in which normal position seen in Figs. 4 and 6 they remain except for the brief period required for unthreading.

At the completion of the insertion of each diagonal strand, the mat must be fed forward, of course, for new work, and the mechanism for accomplishing this must be adapted to feed the mat a single step so as to bring the next diagonal row of meshes into position for threading, and before this operation, obviously, the main clamp must be opened to release the web for its feed movement. The mechanism shown in the drawings for this feeding of the mat will now be described. A short standard, Q, is mounted on the bed at the left hand side thereof looking from the rear end of the machine and in rear of the rock-shaft, E, as seen in Fig. 6. This standard, as shown, is a hollow cylinder and is surmounted by an enlarged cap or plate, $q$. At the rear edge this plate is cut out to provide a notch or recess, $q'$, and on the top a wide groove or channel, $q^2$, is cut the entire length of this plate, running lengthwise of the machine and bordered on each side by dovetailed ledges, $q^3$, except at the recess in the rear edge mentioned above. There is thus provided a wide dove-tailed groove or channel within which is mounted a sliding support, R, which has a base, $r$, dove-tailed to fit the said channel to be held to its seat therein while free to slide back and forth. A kind of web, $r'$, rises from the forward end of this base, its width being extended on each side, but to a greater degree inward than outward. This web does not stand straight across its bed-plate, but is inclined thereto, the inner end being thrown forward and the outer end correspondingly backward, as seen in Fig. 11, the angle of inclination being such as to bring the web about parallel to the main supporting-beam, C. The web also is extended with a slight slope toward the forward part of the machine, as seen in Fig. 11, and from each end there rises a post or standard, $r^2$, thus forming a kind of upright yoke, as seen in Fig. 9. This yoke then will be moved back and forth lengthwise of the machine by the sliding movement of the base, $r$, and in the yoke is mounted a clamping device by which the mat is gripped in rear of the needle-working mechanism and then fed lengthwise forward one step by a sliding movement given to the support, R. This clamp consists of two suitable clamping-bars, S and S'; the bar, S, is the upper member of the clamp, and is mounted on the upper ends of the yoke to which it may be fixed in a stationary position, though there is shown in the drawings a device by which it may be moved vertically for certain purposes, which will be described presently. The mechanism shown in the drawings for moving the said upper clamp bar is a mere matter of convenience and is in no way essential to the operation of the machine. These lifting devices may be entirely dispensed with and the said upper bar, S, simply bolted directly to the upper ends of the yoke, on which it rests, as shown in Fig. 9 of the drawings. Ordinary screw bolts may be used, and this bolt fastening is such an ordinary mechanical expedient and its application to the said bar on the yoke arms, as seen in Fig. 9, is so perfectly obvious and simple that further illustration and description here are unnecessary. The lower bar, S', is mounted so as to be vertically movable; for this purpose the upper ends of the yoke are cut away on the inside for a little distance down, thus providing seats, $r^3$, on the inside of each upright, $r^2$, a little below the upper ends thereof. Pins, $r^4$, are set vertically in these seats, and the bar, S', is mounted loosely on these pins, which pass through the bar and serve as guides thereto, on which it is free to move up and down. Each bar is provided with a suitable gripping surface, $s$, upon its face. A shaft, $S^2$, is mounted in the yoke below the movable clamp-bar, and is provided with eccentrics, $s'$, near each end, and a skew-gear pinion, $s^2$, fixed on the shaft near the middle of its length. Eccentric straps, $s^3$, are applied to the respective eccentrics and at their outer ends are connected to the lower clamp-bar by hinged joints, $s^4$. It will be seen at once that the oscillation of the eccentric-shaft will raise and lower the bar on its guide-pins. This oscillation is effected by means of a bell-crank lever, $S^3$, mounted loosely on the oscillating shaft, E. As this lever stands on the shaft, one of its arms, $s^5$, is nearly upright, and carries upon its upper end a skew-gear segment, $s^6$, which is adapted to engage with the skew-gear pinion on the eccentric shaft, as seen in Fig. 9. The other or short arm, $s^7$, is provided with a roller-pin which is fitted to the groove of a cam, $B^5$, fixed on the main shaft and provided with a cam-groove, $b^7$, which receives the pin above mentioned. The contour of this groove is adapted to reciprocate the lever, $S^3$, at suitable intervals to give the required oscillations to the eccentric shaft for the purpose of raising and lowering the lower clamp-bar as required, with intervening periods of rest. The cam operating the devices for raising and lowering the lower clamp-bar is also constructed so that, when the clamp-support is moved forward for the purpose of feeding the mat, the rack-lever will also be swung in the same direction and coinciding with the movement of the support, so as to retain the skew-gearing in a state of rest with the clamp closed; otherwise the sliding movement of the support would operate the gearing sufficiently to loosen the clamp.

When the mat is gripped by the clamp, as described above, it is evident that it may be fed forward by the bodily movement of the clamp effected by the sliding of the support, R, on its seat. This sliding movement is effected by two bell-crank levers. One of these levers, R', is pivoted to the standard, Q, on the inner side thereof, and one of its arms, $r^5$, is nearly upright and is pivoted or hinged to the inner edge of the sliding base, $r$, of the support within the recess, $q'$, in the standard plate $q$, as seen in Fig. 11. The other arm, $r^6$, of this lever is nearly horizontal and extends toward the rock-shaft, E, being provided near its outer end with a lengthwise slot, $r^7$. The other lever, $R^2$, is mounted loosely on the rock-shaft, E, and has one arm, $r^8$, upright to reach an actuating cam, $B^6$, secured to the main shaft like the other actuating cams which have been heretofore mentioned. This cam is provided with a cam-groove, $b^8$, cut in one face, into which a roller-pin on the end of the arm, $r^8$, is fitted, as seen in Figs. 10 and 11. The other arm, $r^9$, of this lever is nearly horizontal and extends out toward the pivot of the lever, R', and is provided with a lengthwise slot, $r^{10}$, like the slot, $r^7$, in the corresponding arm of the lever, R'. The two slotted arms of these levers overlap each other, as seen in Fig. 9, and are hinged together by a pin or bolt, $r^{11}$, passing through the respective slots and secured by means which permit the adjustment of the pin along the slots and fastening it in any position desired. The device shown for this purpose in the drawings is a small rectangular block or plate, $r^{12}$, through which the pin passes and which is wider than the slot in one of the lever-arms, so as to extend over upon the said arm on each side of the slot, as seen in Fig. 9, in which it is shown applied to the arm of the lever, R'. A nut turned on the other end of the pin secures the parts together and holds the plate in the position to which it is adjusted, this plate also serving as a kind of washer. At the same time, the slotted arms of the respective levers are permitted to hinge or pivot on this pin, so that the oscillation of the lever, $R^2$, by its actuating cam, $B^6$, produces a vibration of the lever, R', by means of the hinge connection between the two, which latter movement will, of course, reciprocate the support, R, to the sliding base of which the lever is connected. In this movement it will be understood that the hinge-pin which forms the connection between the two levers must move up and down, the levers meanwhile turning on the pin, and the adjustment of the latter is to regulate the throw so as to determine the degree of movement given to the slide.

As suggested above, it may be desirable and convenient sometimes to have the upper clamping bar also movable, so that it may be raised for any purpose desired. We have, therefore, shown in the drawings means for effecting this result, but without intending to be limited to this movement of the bar, as for all ordinary purposes it is just as well rigid, as suggested above. As shown in Fig. 9, a shaft, T, is mounted in suitable bearings immediately over the clamp, the bearings shown in the drawings being pins, $t$, which are set rigidly in the extreme upper ends of the yoke, passing down through the upper clamp-bar for this purpose. The clamp-bar is not secured to the yoke and is loose on the pins so that it may slide up and down thereon, and the shaft is mounted in eye-bearings on the upper ends of the pins. The loose upper clamp-bar, S, is hung upon the shaft, T, by means of ears, $s^8$, on the upper side thereof, which are provided with vertical slots, $s^9$, through which the shaft passes. On the shaft are fixed eccentrics, $t'$, arranged one on the outside of each ear, by means of which the bar is suspended from the shaft. Short flanges, $t^2$, are provided on the upper ends of the ears, and extend outward in each direction so as to project over the respective eccentrics. The parts are arranged so that when the eccentrics are turned down, as seen in Fig. 11, they drive the clamping-bar down upon its seats on the yoke and firmly hold it in this position, so that, for the time being, it is immovable. But when the shaft is turned so as to throw the eccentrics up, they will act upon the flanges projecting over them to lift them, thereby lifting the clamping bar which slides upward on its pins, this movement being permitted by reason of the slots in the suspending ears. As the occasion for raising the clamping-bar will be infrequent, it is not necessary to provide mechanism for automatically turning the shaft; it may as well be turned by hand when occasion requires, and for this purpose we provide an angular shank, $t^3$, at one end of the shaft, to which a hand-crank, $t^4$, may be applied, as seen in Fig. 5, for turning the shaft.

We also provide mechanism for winding up the finished web or mat upon its drum at the rear of the machine. This drum, $A^2$, journaled, as already stated, in the rear standards, $a^2$, is provided at one end with a ratchet-wheel, $a^{10}$, fastened to the shaft of the drum. A pawl lever, U, is fastened to one end of a rock-shaft, $u$, mounted in a suitable bearing at the foot of the standard, $a^2$, next to the ratchet. This lever carries on its upper end a pivoted-pawl, $u'$, and the lever and pawl are arranged in the plane of the ratchet and in front thereof, so that the pawl will work into the ratchet and the vibration of the lever will give a step rotation to the drum-shaft and drum. The shaft, $u$, extends inward across the machine until in line with the standard Q, and a second arm or lever, $u^2$, is fastened to this inner end of the shaft, extending upward and slightly forward therefrom. The upper end of this arm, $u^2$, is connected by a link, $u^3$, to the rear end of the sliding-base, $r$, of the support, R, a hook or staple, $u^4$, being provided on the under side of the slide, R, for this purpose, as seen in Fig. 5. Obviously every feed movement of the slide, which, of course, must be toward the rear of the machine, will vibrate the pawl-lever in a direction to engage the pawl with a tooth on the ratchet-wheel, and so turn the drum one step in a direction to wind up the finished web, the several parts being relatively constructed and arranged to give a movement of the drum sufficient to wind up the finished web as it is fed by the sliding clamp at each operative movement of the latter. The return movement of this slide will, of course, swing the pawl-lever back again, bringing the pawl into position to engage with the next tooth. A pivoted pawl, V, mounted below the shaft of the drum, $A^2$, is arranged to engage with the ratchet-wheel on the said shaft, being weighted to hold it up into this engagement and located so as to hold the drum against a backward movement. Ordinary friction-disks, W and W', may also be applied to the respective drums in the usual way. This device is no part of our invention, however, and is employed or used for the ordinary purpose of preventing the movement of the drums under slight influence. A weighted pawl, V', is also provided, as shown in the drawings, being pivoted to one of the standards, $a'$, immediately below the friction-disk, W, and arranged to engage with a notch in the latter for the purpose of holding the disk from turning with the drum.

Without repeating the description of the operation of special groups of mechanism, which have been explained above in connection with the description of the construction and arrangement of these devices, the general operation of the machine may be stated as follows: The previously woven mat is wound upon the front drum and thence conducted through the machine over the guide rollers, $a^5$—$a^6$, and attached to the rear drum. The several mechanisms are all in their normal positions of rest, as described above, and the mat passes through the main clamp and the feed clamp, both of which are open. Care must be taken that the mat is fixed in such a position that a diagonal line of the mesh openings or interstices will lie directly over the centering holes in the lower fixed member of the holding clamp. The machine is then started, and the first action will be the closing of the holding-clamp, the teeth of the upper bar passing down through the diagonal line of mesh openings into their sockets below, and the mat is firmly gripped and held against movement in any direction. Following immediately upon this action, the main slide which carries the needle and its actuating devices is started upon its forward reciprocation, the mechanism for rotating the needle being set in motion at the same time. The forward movement of the main slide thrusts the needle across the fixed mat, and the simultaneous rotation of the needle weaves or twists it through the openings of the mesh, carrying it alternately over and under the opposite strands of an opening by reason of the bent tip at the end of the needle. As the tip end of the needle is thrust out from the front edge of the mat, the threading mechanism is set in operation, and a single strand of cane is threaded into the eye of the needle, as explained above. The return or retreating movement of the main slide then commences and the needle is drawn back through the mat, pulling the strand along through the mat with it, thereby inserting a diagonal strip of cane in the mat, as required in the ordinary construction of woven cane. During this retraction of the needle its revolving devices are inoperative, so that there is no rotation of the needle. Just as the needle passes out at the rear edge of the mat, the diagonal strand is severed by a quick, sharp blow of the cutter at the front edge, as described, and the grip at the rear edge seizes the strand just in front of the needle and the latter is unthreaded just before the rearward movement of the main slide is finished. Meanwhile the feed-clamp has been closed upon the mat just in rear of the holding and adjusting clamp, and as the backward movement of the main slide is completed, the latter is opened and the mechanism for moving the feed-clamp is set in operation so that, as soon as the main or holding clamp is opened, the mat is fed along one step, as explained above, and is simultaneously wound upon the rear drum by the rotation of the latter effected by mechanism acting simultaneously with the feed-slide, as already explained. The feed clamp is at once opened, and the feed-slide makes its return movement, while simultaneously the main slide with the needle thereon commences another forward movement, the holding clamp having been previously closed as explained above, this action being repeated in rapid succession. It will be understood, of course, that all the various devices and groups of mechanism must be constructed, arranged and adapted relatively to each other to produce these successive operations in their proper order and at the proper time, so that there will be harmonious action throughout the machine. It will be noticed from the description above that all the fundamental or primary actuating devices are on the single main shaft, in the shape of a series of cams of different construction secured to and so turning with the shaft.

To insert diagonal strips in the opposite direction, the web is turned over and run through the machine again.

From the above description and explanation it will be seen that we provide a machine in which the entire operation of inserting the ordinary diagonal strips in woven cane is performed by mechanisms operated automatically, so that there is no hand work whatever required except that of ordinary attention to the machine. This work is accomplished with great rapidity and at the same time with perfect accuracy, resulting in an entirely satisfactory finished product.

Obviously there may be many modifications in special devices and combinations and arrangements of devices which are herein shown and described; hence we do not wish to be understood as limiting our invention to all the special details of construction, arrangement and organization herein shown and described, but contemplate in our invention such mechanical changes and modifications as may be made without departing from the fundamental characteristics of the general invention herein set forth.

Having thus described our invention, what we claim to be new, and desire to secure by Letters Patent, is—

1. In a machine for inserting diagonal strands in cane weaving, mechanism for holding the mat in fixed position, in combination with a revoluble crossing-needle having a bent tip, mechanism for thrusting the crossing-needle diagonally across the mat, and mechanism for simultaneously rotating said needle, substantially as described.

2. In a machine for inserting diagonal strands in cane weaving, a clamping mechanism adapted to adjust and clamp the mat in proper position, in combination with a revoluble crossing-needle provided with a bent tip, mechanism for reciprocating said needle across the mat, and mechanism adapted to rotate said needle on the forward movement thereof but inoperative on the return movement, substantially as described.

3. In a machine for inserting diagonal strands in cane weaving, a revoluble crossing-needle having a bent tip, in combination with mechanism for reciprocating said needle diagonally across the mat, threading mechanism adapted to thread a strand of cane into the needle at the end of its forward thrust, and mechanism adapted to rotate the said needle during its forward thrust but inoperative on its return movement, substantially as described.

4. In a machine for inserting diagonal strands in cane weaving, a revoluble crossing-needle having a bent tip, in combination with mechanism for reciprocating said needle diagonally across the mat, mechanism for threading a strand of cane to said needle at the end of its forward thrust, driving mechanism adapted to rotate said needle on its forward thrust but inoperative on its return movement, and a cutting mechanism adapted to sever the diagonal strand as the tip of the needle is withdrawn from the opposite edge of the mat on its return movement, substantially as described.

5. In a machine for inserting diagonal strands in cane weaving, a revoluble crossing-needle having a bent tip, in combination with mechanism for thrusting said needle back and forth across the mat, threading mechanism adapted to thread a strand of cane into the needle at the end of its forward thrust, driving mechanism adapted to rotate said needle on its forward thrust but inoperative on its return movement, cutting mechanism adapted to sever the cane-strand after the threaded end is withdrawn at the opposite edge of the mat by the returning needle, and mechanism for unthreading the needle just after the severing of the strand, substantially as described.

6. In a machine for inserting diagonal strands in cane weaving, a revoluble crossing needle having a bent tip, in combination with mechanism for reciprocating said needle across the mat, mechanism adapted to rotate said needle on its forward thrust but inoperative on its return, and mechanism adapted to feed the mat step by step through the machine as the diagonal strands are successively inserted, substantially as described.

7. In a machine for inserting diagonal strands in cane weaving, a revoluble crossing-needle having a bent tip, in combination with mechanism for reciprocating said needle across the mat, mechanism adapted to rotate said needle on its forward thrust but inoperative on its return, mechanism adapted to feed the mat step by step through the machine as the diagonal strands are successively inserted, and mechanism adapted to roll the finished web upon a drum simultaneously with its forward feed, substantially as described.

8. In a machine for inserting diagonal strands in cane weaving, an adjusting clamp adapted to adjust the mat in proper position for the operation of the crossing-needle and secure it in this adjustment, a revoluble crossing-needle, mechanism adapted to reciprocate said needle just in front of said clamp, and mechanism adapted to rotate the needle on its forward movement but inoperative on the return thereof, substantially as described.

9. In a machine for inserting diagonal strands in cane weaving, two drums arranged respectively at the front and rear of the machine and adapted to carry the woven mat, as described, in combination with an adjusting and clamping mechanism arranged between the drums, a revoluble crossing-needle, mechanism adapted to reciprocate and revolve said needle in front of the said clamp, and feeding and winding mechanism arranged to operate in rear of said clamp, substantially as described.

10. In a machine for inserting diagonal strands in cane weaving, a support arranged diagonally of the mat, in combination with a main slide mounted and adapted to be reciprotated thereon diagonally across the mat; a revoluble crossing-needle mounted on said slide, mechanism also mounted on said slide and adapted to revolve said needle on the forward movement thereof but inoperative on the return, and mechanism adapted to give a reciprocal sliding movement to said main slide, substantially as described.

11. The mat-supporting plate, C', arranged diagonally of the mat and provided with a groove, $c^3$, running lengthwise thereof, in combination with a revoluble crossing-needle having a bent tip, and mechanisms for reciprocating said needle directly over the said groove and simultaneously revolving it, substantially as described.

12. The mat-support plate, C', provided with longitudinal groove, $c^3$, and line of perforations, $c^4$, just in rear thereof, in combination with a movable clamping-bar, D, provided with teeth, $d$, corresponding to the perforations, $c^4$, revoluble crossing-needle, and mechanisms adapted to reciprocate the same along the line of said groove and simultaneously rotate said needle on its forward thrust, substantially as described.

13. The cross-head, D', carrying the toothed clamping-bar, D, in combination with perforated clamping bar, C' movable supports, $d^2$, vertical guide-ways in which said supports are mounted and are free to slide up and down, toggle-arms, $d^7$—$d^{10}$, rock-shaft, E, provided with crank-arms connected respectively to the said toggle-arms, and grooved-cam, B', fixed on the main shaft and engaging with an arm also fixed to the rock-shaft, whereby the latter is oscillated and the toothed clamp raised and lowered by the revolution of the cam, substantially as described.

14. The supporting-beam, C, arranged diagonally of the mat and provided with a longitudinal groove, $c'$, in the front side thereof, in combination with a main slide, F, mounted in said groove and adapted to slide back and forth therein, mechanism adapted to reciprocate said main slide, a revoluble crossing-needle, and mechanism for rotating the same, both mounted on and carried by said bar, substantially as described.

15. The main slide, F, mounted on a support arranged diagonally of the mat and adapted to slide back and forth lengthwise thereon, a revoluble crossing-needle mounted on said main slide, pitman, $f$, shaft, $f'$, provided with crank, F', and bevel-pinion, $f^2$, bell-crank lever, $F^2$, mounted on a support, on which it is free to oscillate, and provided with a rack-segment, $f^3$, on one arm, and cam, $B^2$, fixed on the main shaft and provided with a cam groove engaging the short arm of the said bell-crank lever, substantially as described.

16. The main slide, F, mounted on a support diagonally of the mat and free to slide back and forth thereon, in combination with a revoluble crossing-needle mounted on and carried by said slide, mechanism for rotating said needle and means for operating said mechanism by the forward movement of the slide, to rotate the needle during said forward movement of the slide substantially as described.

17. A main slide mounted upon a suitable support on which it is free to reciprocate diagonally of the mat, in combination with a revoluble shaft, H, mounted on said main slide, crossing-needle, J, connected to and carried by said shaft, pinion, $h'$, mounted loosely on said shaft and having a pawl and ratchet connection therewith, gear-wheel, H', also mounted on the main slide and engaging with said pinion, mechanism for reciprocating the main slide upon its support and mechanism whereby said gear-wheel is rotated by the reciprocation of the said main slide, substantially as described.

18. A main slide mounted upon a suitable support on which it is free to reciprocate diagonally of the mat, in combination with a needle shaft mounted on said main slide and carrying the crossing-needle, pinion, $h'$, mounted loosely on said shaft and connected therewith by pawl and ratchet, gear-wheel, H', mounted on the slide and engaging with the said pinion, hub, G', secured to one side of the gear-wheel, carrier, G, mounted on a fixed support on which it is movable lengthwise, a locking device by which said carrier is secured to its support, a cable, $g^3$, wound around the hub, G', and fastened at its ends to the respective ends of the carrier, G, and mechanism for reciprocating the main slide upon its support substantially as described.

19. A fixed support arranged diagonally of the frame, in combination with the main slide, F, mounted upon said support and free to slide thereon the revoluble needle-shaft mounted on the main slide and provided with driving pinion, and gear-wheel, H', mounted on the same slide and engaging with the said pinion and provided with a hub, G', on one side thereof, carrier, G, mounted and adapted to slide on a fixed support, as $C^2$, cable, $g^3$, wound upon the said hub and connected at its respective ends to the said carrier, spring-catch, $c^6$, pivoted to the stationary support, $C^2$, and engaging with the carrier, G, to fasten the latter to its support, lug, $c^8$, on the main slide adapted to engage the said spring-catch and release the carrier, G, and mechanism for reciprocating the main slide upon its support substantially as described.

20. The main slide, in combination with a support arranged diagonally of the frame on which said slide is mounted and free to move lengthwise thereof a revoluble crossing-needle mounted thereon, gear-wheel, H', also mounted on said slide and connected by gearing with the said needle shaft, driving hub, G', fastened to said wheel, carrier, G, mounted on a fixed support on which it is free to slide, and provided with depending arms, $g$—$g'$, at its respective ends, spring-catch, $c^6$, adapted to connect the carrier, G, to its support, lugs, $c^8$ and $g^7$, on the main slide, F, and mechanism for reciprocating the latter on its support substantially as described.

21. The main slide, F, in combination with the revoluble needle-shaft mounted thereon, driving-gear, H', also mounted on the slide geared to the needle shaft and provided with hub, G', sliding carrier, G, mounted on a fixed support on which it is free to slide, spring-catch adapted to secure the carrier, G, to its support, lug, $c^8$, on the main slide adapted to release the catch and move the carrier forward with the main slide, and stationary stop-block, $c^9$, substantially as described.

22. The revoluble crossing-needle, in combination with the gear-wheel, H', connected by gearing with the said needle shaft, driving hub, G', secured to said wheel and composed of separate sectors, $g^4$, adjustable radially of their axis, and the driving-cable, $g^3$, applied to said hub, substantially as described.

23. The main slide, in combination with a revoluble needle-shaft mounted thereon, needle-chuck, I, secured to the shaft and provided with a stud, $i^2$, at one side thereof, and a stationary stop-plate, $i^3$, provided with slot, $i^4$, adapted to receive the chuck-stud, $i^2$, substantially as described.

24. In a machine for inserting diagonal strands in cane weaving, a main slide arranged to move diagonally of the mat, in combination with means to move the said carrier diagonally a revoluble crossing-needle mounted thereon, a sliding standard mounted on a suitable support at the front edge of the mat and in the path of the said main slide, and threading mechanism mounted on said standard and adapted to be operated by the sliding movement thereof as it is carried outward by the main slide, substantially as described.

25. In a machine for inserting diagonal strands in cane weaving, a main slide arranged to move diagonally of the mat, in combination with the revoluble crossing-needle having a bent tip mounted thereon, mechanism for rotating said needle during its forward thrust through the mat, mechanism for stopping said rotation as the tip of the needle reaches the front edge of the mat, and mechanism adapted to adjust and fix the needle in a position with its bent tip horizontal by the further forward movement thereof, substantially as described.

26. In a machine for inserting diagonal strands in cane weaving, a main slide arranged to move diagonally of the mat, in combination with a revoluble crossing-needle having a bent tip mounted thereon, mechanism for rotating said needle during its forward thrust through the mat, mechanism for stopping said rotation as the tip of the needle reaches the front edge of the mat, mechanism adapted to adjust and fix the needle in a position with its bent tip horizontal by the further forward movement thereof, and threading mechanism adapted to thread a strand of cane into the eye of the needle-tip when thus adjusted, substantially as described.

27. A diagonal main slide, F, in combination with a revoluble crossing-needle, J, mounted thereon, and a fixed level plate, $C^3$, arranged at the front edge of the mat and adapted to turn the tip of the needle into a horizontal position toward the end of its forward thrust, substantially as described.

28. A main slide, in combination with a revoluble crossing-needle, J, mounted thereon and having a bent tip, a stationary level plate, $C^3$, the needle-guide, $J^2$, and the upper movable member, D, of the clamp, to which said guide is secured substantially as described.

29. In a machine for inserting diagonal strands in cane weaving a diagonal main slide, F, a revoluble crossing-needle, J, mounted thereon and having a bent tip, a sliding standard, K, outside of the front edge of the mat, an arm, $k^2$, mounted thereon and provided with a funnel-shaped opening, $k'$, adapted to receive the needle-tip, and a horizontal slot, $k^3$, in front thereof, adapted to permit the insertion of the end of a cane strand, substantially as described.

30. In a machine for inserting diagonal strands in cane weaving, a crossing-needle provided with a bent tip with an eye therein, in combination with the funnel-shaped receiver, $k^2$, having a funnel-shaped opening, $k'$, adapted to receive the bent eye of the needle, and a short horizontal slot, $k^3$, in combination with a feeding mechanism adapted to feed the end of a cane-strand into said slot and through the eye in the needle-tip, substantially as described.

31. In a machine for inserting diagonal strands in cane weaving, a crossing-needle provided with a bent tip with an eye therein, in combination with the funnel-shaped receiver, $k^2$, having a funnel-shaped opening, $k'$, adapted to receive the bent eye of the needle and a short horizontal slot, $k^3$, in combination with a feeding mechanism adapted to feed the end of a cane-strand into said slot through the eye in the needle-tip, and a device for bending the end of the strip projecting through the eye of the needle at an angle to the main strip, substantially as described.

32. A main slide, F, in combination with a revoluble crossing-needle mounted thereon and having a bent tip and eye therein, a sliding standard, K, adapted to be moved by contact of the main slide therewith, funnel-shaped needle-tip receiver, $k^2$, having slot, $k^3$, feed-wheels, L and M, mounted on the standard, K, and adapted to receive a cane-strip between them, and mechanism adapted to be operated by the outward sliding movement of the standard to actuate said wheels to feed the cane-strip into the receiving-funnel and thread it into the eye of the needle, substantially as described.

33. The sliding standard, K, in combination with strand feeding-wheels, L and M, the former mounted on a stationary journal and the latter immediately above on a journal vertically adjustable, and mechanism operated by the sliding of the standard to raise and lower said journal to engage and disengage the feed-wheels, substantially as described.

34. A sliding standard, K, in combination with a feed-wheel, M, mounted on a fixed journal, the upper journal-pin, M', mounted loosely in its bearing and having an eccentric section, $m^4$, the upper feed-wheel, M, mounted on this eccentric section, both wheels being provided with gear-teeth, the forked-crank, $M^2$, secured to the journal-pin, M', inflexible hook, $n$, pivoted at one end to a fixed support and at the other engaging with one arm of the forked-crank, and a retracting spring, $m^8$, connected at one end to the opposite arm of the forked-crank and at the other to the sliding standard, substantially as described.

35. The strip feed-wheel, L, provided with gear-teeth, $l$, and flanges, $l'$, having a channel, $l^2$, between them, in combination with a companion feed-wheel, M, provided with gear-teeth, $m$, a narrow annular groove, $m'$, and outer web, $m^2$, substantially as described.

36. The sliding standard, K, in combination with means for sliding said standard a feed-wheel, L, mounted thereon, ratchet-wheel, L', connected to said feed-wheel, upper feed-wheel, M, both feed-wheels provided with engaging gear-teeth, and pawl, $n'$, mounted on a fixed support and arranged to engage the ratchet-teeth as the standard is moved outward, substantially as described.

37. The main slide, F, in combination with a revoluble crossing-needle mounted thereon and provided with a bent eye-tip, the sliding standard, K, mounted outside the mat and in the path of the main slide, F, a stationary bar provided with a threading-funnel, $k'$, slotted as specified, strip feeding-wheels, L and M, mounted on the standard, K, oscillating eccentric journal, M', on which the upper wheel, M, is mounted, forked-crank, $M^2$, secured to the eccentric journal-pin, inflexible hook, $n$, and spring, $m^8$, connected to the respective arms of said fork, ratchet-wheel, L', connected to the feed-wheel, L, and pawl $n'$, pivoted to a stationary support and arranged to engage the teeth of said ratchet, whereby the standard, K, is moved outward by contact of the main slide, F, on its forward travel, thereby actuating the feeding devices to feed the diagonal strand into the threading funnel and eye of the needle lying therein, substantially as described.

38. A crossing-needle, provided with a bent eye-pointed tip, in combination with a stationary bar provided with a threading-funnel, $k'$, slotted as described, feeding mechanism adapted to thrust the diagonal strip into said funnel and thread the needle, star-wheel, K', just back of said funnel, and mechanism for giving an intermittent rotation to said wheel to bend the projecting end of the cane-strip upon the tip of the needle, substantially as described.

39. A stationary bar provided with the threading-funnel, $k'$, in combination with a crossing-needle, J, having a bent eye-tip, feed-wheels, L and M, adapted to carry the cane-strand into said funnel and thread the needle, star-wheel, K', fixed on shaft, $k^4$, pinion, $k^6$, at the opposite end of said shaft, and pinion, $L^2$, connected with the feed-wheel, L, whereby the pinion $L^2$ is rotated intermittently with the feed wheel to give a corresponding movement to the star-wheel, substantially as described.

40. In a machine for inserting diagonal strands in cane weaving, the main slide, F, in combination with a revoluble crossing-needle, J, mounted thereon and provided with a bent eye-tip, a sliding standard, K, arranged in the path of said main slide and adapted to be moved outward by contact therewith, cane-feeding and threading mechanism mounted on said standard mechanism connected with said standard and constructed to be operated by the outward sliding movement thereof to operate the cane feeding and threading mechanism, and a retracting spring, $k^7$, adapted to return the sliding standard, K, upon the retreat of the main sliding carrier, substantially as described.

41. The cutter, O, pivoted to the standard, K, in combination with mechanism for turning said cutter on its pivot to raise the cutter-end and compress an actuating spring, a spring-catch adapted to engage the outer arm of the cutter and hold it in its said adjustment, and tripping mechanism on the main slide arranged to engage and trip said catch near the end of the return movement of said main slide, thereby releasing the cutter to sever the diagonal strip with a quick, sharp blow under the influence of the compressed spring just about as the needle is withdrawn from the rear edge of the mat, substantially as described.

42. The pivoted cutter, O, in combination with a rod, $o^2$, passing loosely through the outer end of the cutter-arm, spring-coil, $o^3$, secured on the rod immediately below the cutter-arm, movable cam $B^3$ rocking-lever, O', connected at one end to the lower end of the rod, $o^2$, and at the other end provided with a roller-pin working in the cam-groove, $b^5$, of the cam, $B^3$, the spring-catch, $O^2$, adapted to engage the cutter-arm when depressed, and provided with toe-piece, $o^8$, and the main slide, F, provided with tappet $o^9$ adapted to engage the toe of the catch and thereby release the cutter-arm, substantially as described.

43. The diagonal main slide, F, in combination with a crossing-needle mounted thereon, feeding and threading mechanism at the front edge of the mat whereby the diagonal strand of cane is threaded to the needle on its outward thrust, and a gripping device arranged at the back edge of the mat, and mechanism arranged to operate the grip to seize the diagonal strand just as the needle is withdrawn from the mat on its backward thrust, thereby unthreading the needle, substantially as described.

44. The pivoted upper and lower grip-arms, $p$—$p'$, connected at their rear ends by a slot, $p^4$, and pivot bolt, $p^6$, spring, $p^7$, connecting the said grip-arms between their pivots and their rear connection, rocking-lever, P', swinging arm, $P^2$, hinged to the rear end of said rocking lever, connecting rod, $p^9$, hinged respectively to the swinging arm, $P^2$, and lower grip-arm, $p'$, projecting cam-arm, $B^4$, fixed on a revoluble shaft and adapted to contact at each revolution with the foward end of the rocking-lever, P', and crossing needle J whereby the grip arms are sharply closed upon the projecting end of the diagonal strand to unthread the needle, substantially as described.

45. In a machine for inserting diagonal strands in cane weaving, a mechanism for inserting the diagonal strand, in combination with a sliding support mounted in rear of said mechanism a clamping device mounted on said sliding support and arranged to clamp the mat of cane just in rear of the adjusting and holding clamp, an adjusting and holding clamp mounted on the main frame in front of the said sliding support and mechanism adapted to move said sliding support rearward a short distance, as the main clamp is opened, to feed the mat one step forward, substantially as described.

46. In a machine for inserting diagonal strands in cane-weaving, mechanism for inserting the diagonal strand, in combination with a sliding support mounted in rear of said mechanism a clamping device mounted on the said support and arranged to clamp the mat of cane just in rear of the adjusting and holding clamp, a main adjusting and holding clamp mounted on the main frame in front of said sliding support mechanism adapted to move said sliding support rearward a short distance, as the main clamp is opened, to feed the mat one step forward, and the rear drum and mechanism for turning the same actuated by the sliding feed-support to wind the finished mat upon the drum simultaneously with the feed, substantially as described.

47. The sliding support, R, provided with standards, $r^2$, forming a kind of yoke, upper clamp-bar, S, mounted on the upper ends of these standards, lower clamp-bar, S', mounted loosely on said standards and movable vertically, rock-shaft, $S^2$, mounted in said standards below the clamp-bars and provided with eccentrics, $s'$, and skew-gear pinion, $s^2$, eccentric straps, $s^3$, applied to said eccentrics and hinged to the lower clamp-bar, bell-crank lever, $S^3$, mounted loosely on its support and having one arm, $s^5$, provided with a skew-gear segment, $s^6$, engaging with the said skew-gear pinion, main shaft and cam, $B^5$, fixed thereon and provided with cam-groove, $b^7$, and the short arm, $s^7$, of the said bell-crank lever, provided with a pin fitted into the cam groove $b^7$ substantially as described.

48. The standard, Q provided with ways, in combination with the support, R, provided with a base, $r$, mounted and adapted to slide between the ways on said standard, clamp-bars, S—S', mounted on said support to grip the finished mat of cane, bell-crank lever, R', pivoted to the standard, Q, and having one of its arms hinged to the sliding base $r$, bell-crank lever, $R^2$, mounted loosely on its support and having its outer arm, $r^9$, connected to the inner arm $r^6$, of the lever, R', by slot in one and pin on the other, and revoluble cam, $B^6$, provided with cam-groove, $b^8$, engaging with the pin on the end of the inner arm, $r^8$, of the lever, $R^3$, substantially as described.

49. In a machine for inserting diagonal strands in cane weaving, a stationary clamping mechanism for adjusting and holding the mat in fixed position, in combination with a crossing needle mechanism for reciprocating the crossing-needle diagonally of the mat, cutting mechanism to sever the diagonal strip, mechanism for unthreading the needle after drawing through the strand, movable clamping mechanism for feeding the mat, a sliding support on which said feed-clamp is mounted, movable back and forth to make the feed, a main driving-shaft, a series of cams fixed on said shaft and adapted to actuate the said several mechanisms and connecting devices between said cams and the said respective mechanisms whereby the latter are actuated by the said cams respectively, substantially as described.

HENRY B. MORRIS.
     EDMUND MORRIS.

Witnesses:
 JARED H. ORR,
 J. F. KREIDLER.